United States Patent
Opris et al.

(10) Patent No.: US 9,618,361 B2
(45) Date of Patent: Apr. 11, 2017

(54) MEMS DEVICE AUTOMATIC-GAIN CONTROL LOOP FOR MECHANICAL AMPLITUDE DRIVE

(71) Applicant: Fairchild Semiconductor Corporation, San Jose, CA (US)

(72) Inventors: Ion Opris, San Jose, CA (US); Hai Tao, Sunnyvale, CA (US); Shungneng Lee, Sunnyvale, CA (US)

(73) Assignee: FAIRCHILD SEMICONDUCTOR CORPORATION, San Jose, CA (US)

( * ) Notice: Subject to any disclaimer, the term of this patent is extended or adjusted under 35 U.S.C. 154(b) by 1028 days.

(21) Appl. No.: 13/857,363

(22) Filed: Apr. 5, 2013

(65) Prior Publication Data

US 2013/0268227 A1     Oct. 10, 2013

Related U.S. Application Data

(60) Provisional application No. 61/620,641, filed on Apr. 5, 2012.

(51) Int. Cl.
   *G01C 19/56* (2012.01)
   *G01C 25/00* (2006.01)
   *G01C 19/5726* (2012.01)

(52) U.S. Cl.
   CPC ......... *G01C 25/00* (2013.01); *G01C 19/5726* (2013.01)

(58) Field of Classification Search
   CPC .................. G01C 19/5726; G01C 19/5776
   See application file for complete search history.

(56) References Cited

U.S. PATENT DOCUMENTS

| 3,231,729 A | 1/1966 | Stern |
| 4,511,848 A | 4/1985 | Watson |
| 4,896,156 A | 1/1990 | Garverick |

(Continued)

FOREIGN PATENT DOCUMENTS

| CN | 1068444 A | 1/1993 |
| CN | 1198587 A | 11/1998 |

(Continued)

OTHER PUBLICATIONS

"U.S. Appl. No. 12/849,742, Non Final Office Action mailed Mar. 28, 2013", 9 pgs.

(Continued)

*Primary Examiner* — John Chapman, Jr.
(74) *Attorney, Agent, or Firm* — Schwegman Lundberg & Woessner, P.A.

(57) ABSTRACT

This document discusses, among other things, apparatus and methods for digital automatic gain control for driving a MEMS device, such as a proof mass. In an example, an apparatus can include a driver configured to oscillate a proof mass of a MEMS device, a charge-to-voltage (C2V) converter configured to provide oscillation information of the proof mass, an analog-to-digital converter (ADC) configured to provide a digital representation of the oscillation information, and a digital, automatic gain control circuit to provide oscillation amplitude error information using a comparison of the oscillation information to target amplitude information, and to provide a digital drive command signal using an amplified representation of the oscillation amplitude error information.

19 Claims, 3 Drawing Sheets

(56) References Cited

U.S. PATENT DOCUMENTS

| | | |
|---|---|---|
| 5,481,914 A | 1/1996 | Ward |
| 5,487,305 A | 1/1996 | Ristic et al. |
| 5,491,604 A | 2/1996 | Nguyen et al. |
| 5,600,064 A | 2/1997 | Ward |
| 5,656,778 A | 8/1997 | Roszhart |
| 5,659,195 A | 8/1997 | Kaiser et al. |
| 5,703,292 A | 12/1997 | Ward |
| 5,723,790 A | 3/1998 | Andersson |
| 5,751,154 A | 5/1998 | Tsugai |
| 5,760,465 A | 6/1998 | Alcoe et al. |
| 5,765,046 A | 6/1998 | Watanabe et al. |
| 5,894,091 A | 4/1999 | Kubota |
| 5,912,499 A | 6/1999 | Diem et al. |
| 5,992,233 A | 11/1999 | Clark |
| 6,131,457 A | 10/2000 | Sato |
| 6,214,644 B1 | 4/2001 | Glenn |
| 6,230,566 B1 | 5/2001 | Lee et al. |
| 6,236,096 B1 | 5/2001 | Chang et al. |
| 6,250,157 B1 | 6/2001 | Touge |
| 6,253,612 B1 | 7/2001 | Lemkin et al. |
| 6,301,965 B1 | 10/2001 | Chu et al. |
| 6,351,996 B1 | 3/2002 | Nasiri et al. |
| 6,366,468 B1 | 4/2002 | Pan |
| 6,370,937 B2 | 4/2002 | Hsu |
| 6,390,905 B1 | 5/2002 | Korovin et al. |
| 6,501,282 B1 | 12/2002 | Dummermuth et al. |
| 6,504,385 B2 | 1/2003 | Hartwell |
| 6,516,651 B1 | 2/2003 | Geen |
| 6,553,835 B1 | 4/2003 | Hobbs et al. |
| 6,629,448 B1 | 10/2003 | Cvancara |
| 6,654,424 B1 | 11/2003 | Thomae et al. |
| 6,664,941 B2 | 12/2003 | Itakura et al. |
| 6,722,206 B2 | 4/2004 | Takada |
| 6,725,719 B2 | 4/2004 | Cardarelli |
| 6,737,742 B2 | 5/2004 | Sweterlitsch |
| 6,781,231 B2 | 8/2004 | Minervini et al. |
| 6,848,304 B2 | 2/2005 | Geen |
| 7,051,590 B1 | 5/2006 | Lemkin et al. |
| 7,054,778 B2 | 5/2006 | Geiger et al. |
| 7,093,487 B2 | 8/2006 | Mochida |
| 7,166,910 B2 | 1/2007 | Minervini et al. |
| 7,173,402 B2 | 2/2007 | Chen et al. |
| 7,187,735 B2 | 3/2007 | Kent et al. |
| 7,202,552 B2 | 4/2007 | Zhe et al. |
| 7,210,351 B2 | 5/2007 | Lo et al. |
| 7,216,525 B2 | 5/2007 | Schroeder |
| 7,221,767 B2 | 5/2007 | Mullenborn et al. |
| 7,240,552 B2 | 7/2007 | Acar et al. |
| 7,258,011 B2 | 8/2007 | Nasiri et al. |
| 7,258,012 B2 | 8/2007 | Xie et al. |
| 7,266,349 B2 | 9/2007 | Kappes |
| 7,293,460 B2 | 11/2007 | Zarabadi et al. |
| 7,301,212 B1 | 11/2007 | Mian et al. |
| 7,305,880 B2 | 12/2007 | Caminada et al. |
| 7,339,384 B2 | 3/2008 | Peng et al. |
| 7,358,151 B2 | 4/2008 | Araki et al. |
| 7,403,756 B1 | 7/2008 | Jiacinto et al. |
| 7,436,054 B2 | 10/2008 | Zhe |
| 7,444,869 B2 | 11/2008 | Johnson et al. |
| 7,449,355 B2 | 11/2008 | Lutz et al. |
| 7,451,647 B2 | 11/2008 | Matsuhisa et al. |
| 7,454,967 B2 | 11/2008 | Skurnik |
| 7,481,110 B2 | 1/2009 | Handrich et al. |
| 7,518,493 B2 | 4/2009 | Bryzek et al. |
| 7,539,003 B2 | 5/2009 | Ray |
| 7,544,531 B1 | 6/2009 | Grosjean |
| 7,565,839 B2 | 7/2009 | Stewart et al. |
| 7,595,648 B2 | 9/2009 | Ungaretti et al. |
| 7,600,428 B2 | 10/2009 | Robert et al. |
| 7,616,078 B2 | 11/2009 | Prandi et al. |
| 7,622,782 B2 | 11/2009 | Chu et al. |
| 7,694,563 B2 | 4/2010 | Durante et al. |
| 7,706,149 B2 | 4/2010 | Yang et al. |
| 7,781,249 B2 | 8/2010 | Laming et al. |
| 7,795,078 B2 | 9/2010 | Ramakrishna et al. |
| 7,817,331 B2 | 10/2010 | Moidu |
| 7,851,925 B2 | 12/2010 | Theuss et al. |
| 7,859,352 B2 | 12/2010 | Sutton |
| 7,950,281 B2 | 5/2011 | Hammerschmidt |
| 7,965,067 B2 | 6/2011 | Grönthal et al. |
| 8,004,354 B1 | 8/2011 | Pu et al. |
| 8,006,557 B2 | 8/2011 | Yin et al. |
| 8,026,771 B2 | 9/2011 | Kanai et al. |
| 8,037,755 B2 | 10/2011 | Nagata et al. |
| 8,113,050 B2 | 2/2012 | Acar et al. |
| 8,171,792 B2 | 5/2012 | Sameshima |
| 8,201,449 B2 | 6/2012 | Ohuchi et al. |
| 8,250,921 B2 | 8/2012 | Nasiri et al. |
| 8,256,290 B2 | 9/2012 | Mao |
| 8,375,789 B2 | 2/2013 | Prandi et al. |
| 8,378,756 B2 | 2/2013 | Huang et al. |
| 8,421,168 B2 | 4/2013 | Allen et al. |
| 8,476,970 B2 | 7/2013 | Mokhtar et al. |
| 8,497,746 B2 | 7/2013 | Visconti et al. |
| 8,508,290 B2 | 8/2013 | Elsayed et al. |
| 8,643,382 B2 | 2/2014 | Steele et al. |
| 8,661,898 B2 | 3/2014 | Watson |
| 8,710,599 B2 | 4/2014 | Marx et al. |
| 8,739,626 B2 | 6/2014 | Acar |
| 8,742,964 B2 | 6/2014 | Kleks et al. |
| 8,754,694 B2 | 6/2014 | Opris et al. |
| 8,763,459 B2 | 7/2014 | Brand et al. |
| 8,813,564 B2 | 8/2014 | Acar |
| 8,978,475 B2 | 3/2015 | Acar |
| 9,003,882 B1 | 4/2015 | Ayazi et al. |
| 9,006,846 B2 | 4/2015 | Bryzek et al. |
| 9,052,335 B2 | 6/2015 | Coronato et al. |
| 9,062,972 B2 | 6/2015 | Acar et al. |
| 9,069,006 B2 | 6/2015 | Opris et al. |
| 9,094,027 B2 | 7/2015 | Tao et al. |
| 9,095,072 B2 | 7/2015 | Bryzek et al. |
| 9,156,673 B2 | 10/2015 | Bryzek et al. |
| 9,246,018 B2 | 1/2016 | Acar |
| 9,278,845 B2 | 3/2016 | Acar |
| 9,278,846 B2 | 3/2016 | Acar |
| 9,352,961 B2 | 5/2016 | Acar et al. |
| 9,425,328 B2 | 8/2016 | Marx et al. |
| 9,444,404 B2 | 9/2016 | Opris et al. |
| 9,455,354 B2 | 9/2016 | Acar |
| 9,488,693 B2 | 11/2016 | Kleks et al. |
| 2001/0022106 A1 | 9/2001 | Kato et al. |
| 2002/0021059 A1 | 2/2002 | Knowles et al. |
| 2002/0083757 A1 | 7/2002 | Geen |
| 2002/0117728 A1 | 8/2002 | Brosnihan et al. |
| 2002/0178831 A1 | 12/2002 | Takada |
| 2002/0189352 A1 | 12/2002 | Reeds, III et al. |
| 2002/0196445 A1 | 12/2002 | Mcclary et al. |
| 2003/0033850 A1 | 2/2003 | Challoner et al. |
| 2003/0038415 A1 | 2/2003 | Anderson et al. |
| 2003/0061878 A1 | 4/2003 | Pinson |
| 2003/0196475 A1 | 10/2003 | Wyse |
| 2003/0200807 A1 | 10/2003 | Hulsing, II |
| 2003/0222337 A1 | 12/2003 | Stewart |
| 2004/0051508 A1 | 3/2004 | Hamon et al. |
| 2004/0085096 A1 | 5/2004 | Ward et al. |
| 2004/0085784 A1 | 5/2004 | Salama et al. |
| 2004/0088127 A1 | 5/2004 | M'closkey et al. |
| 2004/0119137 A1 | 6/2004 | Leonardi et al. |
| 2004/0177689 A1 | 9/2004 | Cho et al. |
| 2004/0211258 A1 | 10/2004 | Geen |
| 2004/0219340 A1 | 11/2004 | McNeil et al. |
| 2004/0231420 A1 | 11/2004 | Xie et al. |
| 2004/0251793 A1 | 12/2004 | Matushisa |
| 2005/0005698 A1 | 1/2005 | McNeil et al. |
| 2005/0072239 A1 | 4/2005 | Longsdorf et al. |
| 2005/0097957 A1 | 5/2005 | Mcneil et al. |
| 2005/0139005 A1 | 6/2005 | Geen |
| 2005/0189635 A1 | 9/2005 | Humpston et al. |
| 2005/0274181 A1 | 12/2005 | Kutsuna et al. |
| 2006/0032308 A1 | 2/2006 | Acar et al. |
| 2006/0034472 A1 | 2/2006 | Bazarjani et al. |
| 2006/0043608 A1 | 3/2006 | Bernier et al. |
| 2006/0044065 A1 | 3/2006 | Ishida |
| 2006/0097331 A1 | 5/2006 | Hattori |

(56) References Cited

U.S. PATENT DOCUMENTS

| | | |
|---|---|---|
| 2006/0112764 A1 | 6/2006 | Higuchi |
| 2006/0137457 A1 | 6/2006 | Zdeblick |
| 2006/0141786 A1 | 6/2006 | Boezen et al. |
| 2006/0207328 A1 | 9/2006 | Zarabadi et al. |
| 2006/0213265 A1 | 9/2006 | Weber et al. |
| 2006/0213266 A1 | 9/2006 | French et al. |
| 2006/0213268 A1 | 9/2006 | Asami et al. |
| 2006/0246631 A1 | 11/2006 | Lutz et al. |
| 2006/0283245 A1 | 12/2006 | Konno et al. |
| 2007/0013052 A1 | 1/2007 | Zhe et al. |
| 2007/0034005 A1 | 2/2007 | Acar et al. |
| 2007/0040231 A1 | 2/2007 | Harney et al. |
| 2007/0042606 A1 | 2/2007 | Wang et al. |
| 2007/0047744 A1 | 3/2007 | Karney et al. |
| 2007/0071268 A1 | 3/2007 | Harney et al. |
| 2007/0085544 A1 | 4/2007 | Viswanathan |
| 2007/0099327 A1 | 5/2007 | Hartzell et al. |
| 2007/0113653 A1 | 5/2007 | Nasiri et al. |
| 2007/0114643 A1 | 5/2007 | DCamp et al. |
| 2007/0165888 A1 | 7/2007 | Weigold |
| 2007/0180908 A1 | 8/2007 | Seeger et al. |
| 2007/0205492 A1 | 9/2007 | Wang |
| 2007/0214883 A1 | 9/2007 | Durante et al. |
| 2007/0214891 A1 | 9/2007 | Robert et al. |
| 2007/0220973 A1 | 9/2007 | Acar |
| 2007/0222021 A1 | 9/2007 | Yao |
| 2007/0240486 A1 | 10/2007 | Moore et al. |
| 2007/0284682 A1 | 12/2007 | Laming et al. |
| 2008/0022762 A1 | 1/2008 | Skurnik |
| 2008/0049230 A1 | 2/2008 | Chin et al. |
| 2008/0079120 A1 | 4/2008 | Foster et al. |
| 2008/0079444 A1 | 4/2008 | Denison |
| 2008/0081398 A1 | 4/2008 | Lee et al. |
| 2008/0083958 A1 | 4/2008 | Wei et al. |
| 2008/0083960 A1 | 4/2008 | Chen et al. |
| 2008/0092652 A1 | 4/2008 | Acar |
| 2008/0122439 A1 | 5/2008 | Burdick et al. |
| 2008/0157238 A1 | 7/2008 | Hsiao |
| 2008/0157301 A1 | 7/2008 | Ramakrishna et al. |
| 2008/0169811 A1 | 7/2008 | Viswanathan |
| 2008/0202237 A1 | 8/2008 | Hammerschmidt |
| 2008/0245148 A1 | 10/2008 | Fukumoto |
| 2008/0247585 A1 | 10/2008 | Leidl et al. |
| 2008/0251866 A1 | 10/2008 | Belt et al. |
| 2008/0253057 A1 | 10/2008 | Rijks et al. |
| 2008/0284365 A1 | 11/2008 | Sri-Jayantha et al. |
| 2008/0290756 A1 | 11/2008 | Huang |
| 2008/0302559 A1 | 12/2008 | Leedy |
| 2008/0314147 A1 | 12/2008 | Nasiri |
| 2009/0007661 A1 | 1/2009 | Nasiri et al. |
| 2009/0056443 A1 | 3/2009 | Netzer |
| 2009/0064780 A1 | 3/2009 | Coronato et al. |
| 2009/0064781 A1 | 3/2009 | Ayazi et al. |
| 2009/0072663 A1 | 3/2009 | Ayazi et al. |
| 2009/0085191 A1 | 4/2009 | Najafi et al. |
| 2009/0114016 A1 | 5/2009 | Nasiri et al. |
| 2009/0140606 A1 | 6/2009 | Huang |
| 2009/0166827 A1 | 7/2009 | Foster et al. |
| 2009/0175477 A1 | 7/2009 | Suzuki et al. |
| 2009/0183570 A1 | 7/2009 | Acar et al. |
| 2009/0194829 A1 | 8/2009 | Chung et al. |
| 2009/0217757 A1 | 9/2009 | Nozawa |
| 2009/0263937 A1 | 10/2009 | Ramakrishna et al. |
| 2009/0266163 A1 | 10/2009 | Ohuchi et al. |
| 2009/0272189 A1 | 11/2009 | Acar et al. |
| 2010/0019393 A1 | 1/2010 | Hsieh et al. |
| 2010/0024548 A1 | 2/2010 | Cardarelli |
| 2010/0038733 A1 | 2/2010 | Minervini |
| 2010/0044853 A1 | 2/2010 | Dekker et al. |
| 2010/0052082 A1 | 3/2010 | Lee |
| 2010/0058864 A1 | 3/2010 | Hsu et al. |
| 2010/0072626 A1 | 3/2010 | Theuss et al. |
| 2010/0077858 A1 | 4/2010 | Kawakubo et al. |
| 2010/0089154 A1 | 4/2010 | Ballas et al. |
| 2010/0122579 A1 | 5/2010 | Hsu et al. |
| 2010/0126269 A1 | 5/2010 | Coronato et al. |
| 2010/0132461 A1 | 6/2010 | Hauer et al. |
| 2010/0155863 A1 | 6/2010 | Weekamp |
| 2010/0194615 A1 | 8/2010 | Lu |
| 2010/0206074 A1 | 8/2010 | Yoshida et al. |
| 2010/0212425 A1 | 8/2010 | Hsu et al. |
| 2010/0224004 A1 | 9/2010 | Suminto et al. |
| 2010/0231452 A1 | 9/2010 | Babakhani et al. |
| 2010/0236327 A1 | 9/2010 | Mao et al. |
| 2010/0263445 A1 | 10/2010 | Hayner et al. |
| 2010/0294039 A1 | 11/2010 | Geen |
| 2011/0023605 A1 | 2/2011 | Tripoli et al. |
| 2011/0030473 A1 | 2/2011 | Acar |
| 2011/0030474 A1 | 2/2011 | Kuang et al. |
| 2011/0031565 A1 | 2/2011 | Marx et al. |
| 2011/0074389 A1 | 3/2011 | Knierim et al. |
| 2011/0094302 A1 | 4/2011 | Schofield et al. |
| 2011/0120221 A1 | 5/2011 | Yoda |
| 2011/0121413 A1 | 5/2011 | Allen et al. |
| 2011/0146403 A1 | 6/2011 | Rizzo Piazza Roncoroni et al. |
| 2011/0147859 A1 | 6/2011 | Tanaka et al. |
| 2011/0179868 A1 | 7/2011 | Kaino et al. |
| 2011/0192226 A1* | 8/2011 | Hayner ............ G01C 19/5776 73/504.12 |
| 2011/0201197 A1 | 8/2011 | Nilsson et al. |
| 2011/0234312 A1 | 9/2011 | Lachhwani et al. |
| 2011/0265564 A1 | 11/2011 | Acar et al. |
| 2011/0285445 A1 | 11/2011 | Huang et al. |
| 2011/0316048 A1 | 12/2011 | Ikeda et al. |
| 2012/0126349 A1 | 5/2012 | Horning et al. |
| 2012/0162947 A1 | 6/2012 | O'donnell et al. |
| 2012/0191398 A1* | 7/2012 | Murakami ......... G01C 19/5776 702/99 |
| 2012/0326248 A1 | 12/2012 | Daneman et al. |
| 2013/0051586 A1 | 2/2013 | Stephanou et al. |
| 2013/0098153 A1 | 4/2013 | Trusov et al. |
| 2013/0099836 A1 | 4/2013 | Shaeffer et al. |
| 2013/0139591 A1 | 6/2013 | Acar |
| 2013/0139592 A1 | 6/2013 | Acar |
| 2013/0192364 A1 | 8/2013 | Acar |
| 2013/0192369 A1 | 8/2013 | Acar et al. |
| 2013/0199263 A1 | 8/2013 | Egretzberger et al. |
| 2013/0199294 A1 | 8/2013 | Townsend et al. |
| 2013/0221457 A1 | 8/2013 | Conti et al. |
| 2013/0247666 A1 | 9/2013 | Acar |
| 2013/0247668 A1 | 9/2013 | Bryzek |
| 2013/0250532 A1 | 9/2013 | Bryzek et al. |
| 2013/0257487 A1 | 10/2013 | Opris et al. |
| 2013/0263641 A1 | 10/2013 | Opris et al. |
| 2013/0263665 A1 | 10/2013 | Opris et al. |
| 2013/0265070 A1 | 10/2013 | Kleks et al. |
| 2013/0265183 A1 | 10/2013 | Kleks et al. |
| 2013/0268228 A1 | 10/2013 | Opris et al. |
| 2013/0269413 A1 | 10/2013 | Tao et al. |
| 2013/0270657 A1 | 10/2013 | Acar et al. |
| 2013/0270660 A1 | 10/2013 | Bryzek et al. |
| 2013/0271228 A1 | 10/2013 | Tao et al. |
| 2013/0277772 A1 | 10/2013 | Bryzek et al. |
| 2013/0277773 A1 | 10/2013 | Bryzek et al. |
| 2013/0283911 A1 | 10/2013 | Ayazi et al. |
| 2013/0298671 A1 | 11/2013 | Acar et al. |
| 2013/0328139 A1 | 12/2013 | Acar |
| 2013/0341737 A1 | 12/2013 | Bryzek et al. |
| 2014/0070339 A1 | 3/2014 | Marx |
| 2014/0190258 A1 | 7/2014 | Donadel et al. |
| 2014/0275857 A1 | 9/2014 | Toth et al. |
| 2014/0306773 A1 | 10/2014 | Kim |
| 2015/0059473 A1 | 3/2015 | Jia |
| 2015/0114112 A1 | 4/2015 | Valzasina et al. |
| 2015/0185012 A1 | 7/2015 | Acar |
| 2015/0268284 A1 | 9/2015 | Opris et al. |
| 2016/0003618 A1 | 1/2016 | Boser et al. |
| 2016/0161256 A1 | 6/2016 | Lee et al. |
| 2016/0264404 A1 | 9/2016 | Acar |
| 2016/0332868 A1 | 11/2016 | Marx |

(56) References Cited

U.S. PATENT DOCUMENTS

FOREIGN PATENT DOCUMENTS

| | | | |
|---|---|---|---|
| CN | 1206110 A | 1/1999 |
| CN | 1221210 A | 6/1999 |
| CN | 1272622 A | 11/2000 |
| CN | 102156201 A | 8/2001 |
| CN | 1389704 A | 1/2003 |
| CN | 1532524 A | 9/2004 |
| CN | 1595062 A | 3/2005 |
| CN | 1595063 A | 3/2005 |
| CN | 1603842 A | 4/2005 |
| CN | 1617334 A | 5/2005 |
| CN | 1659810 A | 8/2005 |
| CN | 1693181 A | 11/2005 |
| CN | 1780732 A | 5/2006 |
| CN | 1813192 A | 8/2006 |
| CN | 1816747 A | 8/2006 |
| CN | 1818552 A | 8/2006 |
| CN | 1886669 A | 12/2006 |
| CN | 1905167 A | 1/2007 |
| CN | 1948906 A | 4/2007 |
| CN | 101038299 A | 9/2007 |
| CN | 101044684 A | 9/2007 |
| CN | 101059530 A | 10/2007 |
| CN | 101067555 A | 11/2007 |
| CN | 101069099 A | 11/2007 |
| CN | 101078736 A | 11/2007 |
| CN | 101171665 A | 4/2008 |
| CN | 101180516 A | 5/2008 |
| CN | 101198874 A | 6/2008 |
| CN | 101213461 A | 7/2008 |
| CN | 101217263 A | 7/2008 |
| CN | 101239697 A | 8/2008 |
| CN | 101257000 A | 9/2008 |
| CN | 101270988 A | 9/2008 |
| CN | 101316462 A | 12/2008 |
| CN | 101329446 A | 12/2008 |
| CN | 101426718 A | 5/2009 |
| CN | 101459866 A | 6/2009 |
| CN | 101519183 A | 9/2009 |
| CN | 101520327 A | 9/2009 |
| CN | 101561275 A | 10/2009 |
| CN | 101634662 A | 1/2010 |
| CN | 101638211 A | 2/2010 |
| CN | 101639487 A | 2/2010 |
| CN | 101666813 A | 3/2010 |
| CN | 101738496 A | 6/2010 |
| CN | 101813480 A | 8/2010 |
| CN | 101839718 A | 9/2010 |
| CN | 101055180 A | 10/2010 |
| CN | 101855516 A | 10/2010 |
| CN | 101858928 A | 10/2010 |
| CN | 101916754 A | 12/2010 |
| CN | 101922934 A | 12/2010 |
| CN | 201688848 U | 12/2010 |
| CN | 102109345 A | 6/2011 |
| CN | 102332894 A | 1/2012 |
| CN | 102337541 A | 2/2012 |
| CN | 102364671 A | 2/2012 |
| CN | 102597699 A | 7/2012 |
| CN | 103209922 A | 7/2013 |
| CN | 103210278 A | 7/2013 |
| CN | 103221331 A | 7/2013 |
| CN | 103221332 A | 7/2013 |
| CN | 103221333 A | 7/2013 |
| CN | 103221778 A | 7/2013 |
| CN | 103221779 A | 7/2013 |
| CN | 103221795 A | 7/2013 |
| CN | 103238075 A | 8/2013 |
| CN | 103363969 A | 10/2013 |
| CN | 103363983 A | 10/2013 |
| CN | 103364590 A | 10/2013 |
| CN | 103364593 A | 10/2013 |
| CN | 103368503 A | 10/2013 |
| CN | 103368562 A | 10/2013 |
| CN | 103368577 A | 10/2013 |
| CN | 103376099 A | 10/2013 |
| CN | 103376102 A | 10/2013 |
| CN | 203261317 U | 10/2013 |
| CN | 103403495 A | 11/2013 |
| CN | 203275441 U | 11/2013 |
| CN | 203275442 U | 11/2013 |
| CN | 203301454 U | 11/2013 |
| CN | 203349832 U | 12/2013 |
| CN | 203349834 U | 12/2013 |
| CN | 103663344 A | 3/2014 |
| CN | 203683082 U | 7/2014 |
| CN | 203719664 U | 7/2014 |
| CN | 104094084 A | 10/2014 |
| CN | 104105945 A | 10/2014 |
| CN | 104220840 A | 12/2014 |
| CN | 104272062 A | 1/2015 |
| CN | 103221778 B | 3/2016 |
| CN | 104272062 B | 5/2016 |
| DE | 112011103124 T5 | 12/2013 |
| DE | 102013014881 A1 | 3/2014 |
| EP | 0638782 A1 | 2/1995 |
| EP | 1055910 A1 | 11/2000 |
| EP | 1335185 A1 | 8/2003 |
| EP | 1460380 A1 | 9/2004 |
| EP | 1521086 A1 | 4/2005 |
| EP | 1688705 A2 | 8/2006 |
| EP | 1832841 A1 | 9/2007 |
| EP | 1860402 A1 | 11/2007 |
| EP | 2053413 A1 | 4/2009 |
| EP | 2096759 A1 | 9/2009 |
| EP | 2259019 A1 | 12/2010 |
| EP | 2466257 A1 | 6/2012 |
| EP | 2616772 B1 | 6/2016 |
| EP | 2647593 B1 | 8/2016 |
| JP | 0989927 A | 4/1997 |
| JP | 09089927 A | 4/1997 |
| JP | 10239347 A | 9/1998 |
| JP | 1164002 A | 3/1999 |
| JP | 2000046560 A | 2/2000 |
| JP | 2005024310 A | 1/2005 |
| JP | 2005114394 A | 4/2005 |
| JP | 2005294462 A | 10/2005 |
| JP | 3882972 B2 | 2/2007 |
| JP | 2007024864 A | 2/2007 |
| JP | 2008294455 A | 12/2008 |
| JP | 2009075097 A | 4/2009 |
| JP | 2009186213 A | 8/2009 |
| JP | 2009192458 A | 8/2009 |
| JP | 2009260348 A | 11/2009 |
| JP | 2010025898 A | 2/2010 |
| JP | 2010506182 A | 2/2010 |
| KR | 1020110055449 A1 | 5/2011 |
| KR | 1020130052652 A | 5/2013 |
| KR | 1020130052653 A | 5/2013 |
| KR | 1020130054441 A | 5/2013 |
| KR | 1020130055693 A | 5/2013 |
| KR | 1020130057485 A | 5/2013 |
| KR | 1020130060338 A | 6/2013 |
| KR | 1020130061181 A | 6/2013 |
| KR | 101311966 B1 | 9/2013 |
| KR | 1020130097209 A | 9/2013 |
| KR | 101318810 B1 | 10/2013 |
| KR | 1020130037462 A | 10/2013 |
| KR | 1020130112789 A | 10/2013 |
| KR | 1020130112792 A | 10/2013 |
| KR | 1020130112804 A | 10/2013 |
| KR | 1020130113385 A | 10/2013 |
| KR | 1020130113386 A | 10/2013 |
| KR | 1020130113391 A | 10/2013 |
| KR | 1020130116189 A | 10/2013 |
| KR | 1020130116212 A | 10/2013 |
| KR | 101332701 B1 | 11/2013 |
| KR | 1020130139914 A | 12/2013 |
| KR | 1020130142116 A | 12/2013 |
| KR | 101352827 B1 | 1/2014 |
| KR | 1020140034713 A | 3/2014 |
| TW | I255341 B | 5/2006 |
| WO | WO-9311514 A1 | 6/1993 |

(56) References Cited

FOREIGN PATENT DOCUMENTS

| | | |
|---|---|---|
| WO | WO-9503534 A1 | 2/1995 |
| WO | WO-0107875 A1 | 2/2001 |
| WO | WO-0175455 A2 | 10/2001 |
| WO | WO-2008014246 A1 | 1/2008 |
| WO | WO-2008059757 A1 | 5/2008 |
| WO | WO-2008087578 A2 | 7/2008 |
| WO | WO-2009038924 A2 | 3/2009 |
| WO | WO-2009050578 A2 | 4/2009 |
| WO | WO-2009156485 A1 | 12/2009 |
| WO | WO-2011016859 A2 | 2/2011 |
| WO | WO-2011016859 A3 | 2/2011 |
| WO | WO-2011107542 A2 | 9/2011 |
| WO | WO-2012037492 A2 | 3/2012 |
| WO | WO-2012037492 A3 | 3/2012 |
| WO | WO-2012037501 A2 | 3/2012 |
| WO | WO-2012037501 A3 | 3/2012 |
| WO | WO-2012037536 A2 | 3/2012 |
| WO | WO-2012037537 A2 | 3/2012 |
| WO | WO-2012037538 A2 | 3/2012 |
| WO | WO-2012037539 A1 | 3/2012 |
| WO | WO-2012037539 A9 | 3/2012 |
| WO | WO-2012037540 A2 | 3/2012 |
| WO | WO-2012040194 A1 | 3/2012 |
| WO | WO-2012040211 A2 | 3/2012 |
| WO | WO-2012040245 A2 | 3/2012 |
| WO | WO-2012040245 A3 | 3/2012 |
| WO | WO-2013115967 A1 | 8/2013 |
| WO | WO-2013116356 A1 | 8/2013 |
| WO | WO-2013116514 A1 | 8/2013 |
| WO | WO-2013116522 A1 | 8/2013 |

OTHER PUBLICATIONS

"U.S. Appl. No. 12/849,742, Non Final Office Action mailed Aug. 23, 2012", 9 pgs.
"U.S. Appl. No. 12/849,787, Response filed Feb. 4, 2013 to Restriction Requirement mailed Oct. 4, 2012", 7 pgs.
"U.S. Appl. No. 12/849,787, Restriction Requirement mailed Oct. 4, 2012", 5 pgs.
"Application Serial No. PCT/US2011/052006, International Republished Application mailed Jun. 7, 2012", 1 pg.
"Application Serial No. PCT/US2011/052417, International Republished Application mailed Jun. 7, 2012", 1 pg.
"International Application Serial No. PCT/US2010/002166, International Preliminary Report on Patentability mailed Feb. 16, 2012", 6 pgs.
"International Application Serial No. PCT/US2010/002166, International Search Report mailed Feb. 28, 2011", 3 pgs.
"International Application Serial No. PCT/US2010/002166, Written Opinion mailed Feb. 28, 2011", 4 pgs.
"International Application Serial No. PCT/US2011/051994, International Search Report mailed Apr. 16, 2012", 3 pgs.
"International Application Serial No. PCT/US2011/051994, Written Opinion mailed Apr. 16, 2012", 6 pgs.
"International Application Serial No. PCT/US2011/052006, International Preliminary Report on Patentability mailed Mar. 28, 2013", 7 pgs.
"International Application Serial No. PCT/US2011/052006, Search Report mailed Apr. 16, 2012", 3 pgs.
"International Application Serial No. PCT/US2011/052006, Written Opinion mailed Apr. 16, 2012", 5 pgs.
"International Application Serial No. PCT/US2011/052059, International Preliminary Report on Patentability mailed Jan. 22, 2013", 14 pgs.
"International Application Serial No. PCT/US2011/052059, Search Report mailed Apr. 20, 2012", 4 pgs.
"International Application Serial No. PCT/US2011/052059, Written Opinion mailed Apr. 20, 2012", 7 pgs.
"International Application Serial No. PCT/US2011/052060, International Preliminary Report on Patentability mailed Jan. 22, 2013", 12 pgs.
"International Application Serial No. PCT/US2011/052060, International Search Report Apr. 20, 2012", 3 pgs.
"International Application Serial No. PCT/US2011/052060, Written Opinion mailed Apr. 20, 2012", 7 pgs.
"International Application Serial No. PCT/US2011/052061, International Preliminary Report on Patentability mailed Mar. 28, 2013", 6 pgs.
"International Application Serial No. PCT/US2011/052061, International Search Report mailed Apr. 10, 2012", 3 pgs.
"International Application Serial No. PCT/US2011/052061, Written Opinion mailed Apr. 10, 2012", 4 pgs.
"International Application Serial No. PCT/US2011/052064, International Preliminary Report on Patentability mailed Mar. 28, 2013", 5 pgs.
"International Application Serial No. PCT/US2011/052064, Search Report mailed Feb. 29, 2012", 3 pgs.
"International Application Serial No. PCT/US2011/052064, Written Opinion mailed Feb. 29, 2012", 3 pgs.
"International Application Serial No. PCT/US2011/052065, International Preliminary Report on Patentability mailed Mar. 28, 2013", 7 pgs.
"International Application Serial No. PCT/US2011/052065, International Search Report mailed Apr. 10, 2012", 3 pgs.
"International Application Serial No. PCT/US2011/052065, Written Opinion mailed Apr. 10, 2012", 5 pgs.
"International Application Serial No. PCT/US2011/052369, International Search Report mailed Apr. 24, 2012", 6 pgs.
"International Application Serial No. PCT/US2011/052369, Written Opinion mailed Apr. 24, 2012", 3 pgs.
"International Application Serial No. PCT/US2011/052417, International Preliminary Report on Patentability mailed Apr. 4, 2013", 6 pgs.
"International Application Serial No. PCT/US2011/052417, International Search Report mailed Apr. 23, 2012", 5 pgs.
"International Application Serial No. PCT/US2011/052417, Written Opinion mailed Apr. 23, 2012", 4 pgs.
Beyne, E, et al., "Through-silicon via and die stacking technologies for microsystems-integration", IEEE International Electron Devices Meeting, 2008. IEDM 2008., (Dec. 2008), 1-4.
Cabruja, Enric, et al., "Piezoresistive Accelerometers for MCM-Package—Part II", The Packaging Journal of Microelectromechanical Systems. vol. 14, No. 4, (Aug. 2005), 806-811.
Ezekwe, Chinwuba David, "Readout Techniques for High-Q Micromachined Vibratory Rate Gyroscopes", Electrical Engineering and Computer Sciences University of California at Berkeley, Technical Report No. UCB/EECS-2007-176, http://www.eecs.berkeley.edu/Pubs/TechRpts/2007/EECS-2007-176.html, (Dec. 21, 2007), 94 pgs.
Rimskog, Magnus, "Through Wafer Via Technology for MEMS and 3D Integration", 32nd IEEE/CPMT International Electronic Manufacturing Technology Symposium, 2007. IEMT '07., (2007), 286-289.
"U.S. Appl. No. 13/362,955, Notice of Allowance mailed Feb. 25, 2015", 8 pgs.
"U.S. Appl. No. 13/362,955, Response filed Jan. 16, 2015 to Final Office Action mailed Nov. 19, 2014", 9 pgs.
"U.S. Appl. No. 13/363,537, Corrected Notice of Allowance mailed Jan. 28, 2015", 2 pgs.
"U.S. Appl. No. 13/742,994, Non Final Office Action mailed May 1, 2015", 20 pgs.
"U.S. Appl. No. 13/755,953, Non Final Office Action mailed May 14, 2015", 11 pgs.
"U.S. Appl. No. 13/755,953, Response filed May 4, 2015 to Restrictiion Requirement mailed Mar. 3, 2015", 7 pgs.
"U.S. Appl. No. 13/755,953, Restriction Requirement mailed Mar. 3, 2015", 6 pgs.
"U.S. Appl. No. 13/765,068, Notice of Allowance mailed May 7, 2015", 12 pgs.
"U.S. Appl. No. 13/813,443, Restriction Requirement mailed Apr. 29, 2015", 6 pgs.
"U.S. Appl. No. 13/821,586, Non Final Office Action mailed Jan. 15, 2015", 8 pgs.

(56) References Cited

OTHER PUBLICATIONS

"U.S. Appl. No. 13/821,586, Response filed May 15, 2015 to Non Final Office Action mailed Jan. 15, 2015", 12 pgs.
"U.S. Appl. No. 13/821,589, Final Office Action mailed Mar. 12, 2015", 13 pgs.
"U.S. Appl. No. 13/821,589, response filed May 12, 2015 to final office action mailed Mar. 12, 2015", 12 pgs.
"U.S. Appl. No. 13/821,598, Response filed Feb. 20, 2015 to Non Final Office Action mailed Nov. 20, 2014", 12 pgs.
"U.S. Appl. No. 13/821,609, Notice of Allowance mailed Mar. 23, 2015", 11 pgs.
"U.S. Appl. No. 13/821,609, Response filed Feb. 13, 2015 to Restriction Requirement mailed Dec. 15, 2014", 6 pgs.
"U.S. Appl. No. 13/821,609, Restriction Requirement mailed Dec. 15, 2014", 7 pgs.
"U.S. Appl. No. 13/821,612, Notice of Allowance mailed Dec. 10, 2014", 8 pgs.
"U.S. Appl. No. 13/821,842, Non Final Office Action mailed Mar. 18, 2015", 20 pgs.
"U.S. Appl. No. 13/821,853, Non Final Office Action mailed Feb. 18, 2015", 15 pgs.
"U.S. Appl. No. 13/821,853, Response filed Dec. 1, 2014 to Non Final Office Action mailed Jul. 30, 2014", 10 pgs.
"U.S. Appl. No. 13/860,761, Advisory Action mailed Mar. 25, 2015", 3 pgs.
"U.S. Appl. No. 13/860,761, Final Office Action mailed Jan. 15, 2015", 14 pgs.
"U.S. Appl. No. 13/860,761, Notice of Allowance mailed Apr. 28, 2015", 8 pgs.
"U.S. Appl. No. 13/860,761, Response filed Mar. 16, 2015 to Final Office Action mailed Jan. 16, 2015", 12 pgs.
"U.S. Appl. No. 13/860,761, Response filed Apr. 16, 2015 to Advisory Action mailed Mar. 25, 2015", 11 pgs.
"U.S. Appl. No. 13/860,761, Response filed Dec. 19, 2014 to Non Final Office Action mailed Aug. 19, 2014", 12 pgs.
"U.S. Appl. No. 14/658,579, Prliminary Amendment filed Mar. 18, 2015", 8 pgs.
"Chinese Application Serial No. 201180054796.3, Office Action mailed Jan. 30, 2015", with English translation of claims, 5 pgs.
"Chinese Application Serial No. 201180054796.3, Response filed Nov. 19, 2014 to Office Action mailed Sep. 4, 2014", with English translation of claims, 7 pgs.
"Chinese Application Serial No. 201180054796.3, Response filed Apr. 14, 2015 to Office Action mailed Jan. 30, 2015", w/ English Claims, 30 pgs.
"Chinese Application Serial No. 201180055309.5, Office Action mailed Jan. 8, 2015", with English translation of claims, 5 pgs.
"Chinese Application Serial No. 201180055630.3, Office Action mailed Dec. 22, 2014", with English translation of claims, 10 pgs.
"Chinese Application Serial No. 201180055630.3, Response filed Apr. 20, 2015 to Office Action mailed Dec. 22, 2014", w/ English Claims, 10 pgs.
"Chinese Application Serial No. 201180055792.7, Office Action mailed Dec. 22, 2014", with English translation of claims, 10 pgs.
"Chinese Application Serial No. 201180055792.7, Response filed May 5, 2015 to Office Action mailed Dec. 22, 2014", w/ English Claims, 15 pgs.
"Chinese Application Serial No. 201180055794.6, Office Action mailed Dec. 17, 2014", with English translation of claims, 9 pgs.
"Chinese Application Serial No. 201180055794.6, Response filed May 4, 2015 to Office Action mailed Dec. 17, 2014", w/ English Claims, 15 pgs.
"Chinese Application Serial No. 201180055823.9, Office Action mailed Mar. 19, 2015", w/English Claims, 8 pgs.
"Chinese Application Serial No. 201180055845.5, Office Action mailed Mar. 4, 2015", w/English Claims, 8 pgs.
"Chinese Application Serial No. 2013101188456, Response filed Jan. 21, 2015", with English translation of claims, 16 pgs.
"Chinese Application Serial No. 201310119472.4, Response filed Jan. 21, 2015", with English translation of claims, 16 pgs.
"Chinese Application Serial No. 201310119730.9, Office Action mailed May 4, 2015", w/English Claims, 8 pgs.
"Chinese Application Serial No. 201310127961.4, Office Action mailed May 6, 2015", w/English Claims, 7 pgs.
"Chinese Application Serial No. 201380007588.7, Response filed Oct. 24, 2014", with English translation, 3 pgs.
"Chinese Application Serial No. 201380007615.0, Response filed Oct. 24, 2014", with English translation, 3 pgs.
"European Application Serial No. 11826067.8, Response filed Apr. 27, 2015 to Extended European Search Report mailed Oct. 6, 2014", 32 pgs.
"European Application Serial No. 11826068.6, Response filed Feb. 9, 2015", 30 pgs.
"European Application Serial No. 11826071.0, Examination Notification Art. 94(3) mailed Dec. 11, 2014", 4 pgs.
"European Application Serial No. 11826071.0, Response filed Apr. 13, 2015 to Examination Notification Art. 94(3) mailed Dec. 11, 2014", 5 pgs.
"European Application Serial No. 13001695.9, Extended European Search Report mailed Jan. 22, 2015", 8 pgs.
"European Application Serial No. 13001719.7, Response filed Jan. 21, 2015", 29 pgs.
"U.S. Appl. No. 12/849,742, Response filed Jan. 23, 2012 to Non Final Office Action mailed Aug. 23, 2012", 10 pgs.
"U.S. Appl. No. 12/849,787, Non Final Office Action mailed May 28, 2013", 18 pgs.
"U.S. Appl. No. 12/947,543, Notice of Allowance mailed Dec. 17, 2012", 11 pgs.
"U.S. Appl. No. 13/813,443, Preliminary Amendment mailed Jan. 31, 2013", 3 pgs.
"U.S. Appl. No. 13/821,586, Preliminary Amendment mailed Mar. 8, 2013", 6 pgs.
"U.S. Appl. No. 13/821,589, Preliminary Amendment mailed Mar. 8, 2013", 6 pgs.
"U.S. Appl. No. 13/821,598, Preliminary Amendment mailed Mar. 8, 2013", 7 pgs.
"U.S. Appl. No. 13/821,609, Preliminary Amendment mailed Mar. 8, 2013", 3 pgs.
"U.S. Appl. No. 13/821,612, Preliminary Amendment mailed Mar. 8, 2013", 3 pgs.
"U.S. Appl. No. 13/821,619, Preliminary Amendment mailed Mar. 8, 2013", 3 pgs.
"U.S. Appl. No. 13/821,793, Preliminary Amendment mailed Mar. 8, 2013", 3 pgs.
"U.S. Appl. No. 13/821,842, Preliminary Amendment mailed Mar. 8, 2013", 3 pgs.
"U.S. Appl. No. 13/821,853, Preliminary Amendment mailed Mar. 8, 2013", 3 pgs.
"Application Serial No. PCT/US2011/051994, International Republished Application mailed Jun. 7, 2012", 1 pg.
"DigiSiMic™ Digital Silicon Microphone Pulse Part No. TC100E", TC100E Datasheet version 4.2 DigiSiMic™ Digital Silicon Microphone. (Jan. 2009), 6 pgs.
"EPCOS MEMS Microphone With TSV", 1 pg.
"International Application Serial No. PCT/US2011/051994, International Preliminary Report on Patentability mailed Mar. 28, 2013", 8 pgs.
"International Application Serial No. PCT/US2011/052340, International Preliminary Report on Patentability mailed Apr. 4, 2013", 5 pgs.
"International Application Serial No. PCT/US2011/052340, Search Report mailed Feb. 29, 2012", 3 pgs.
"International Application Serial No. PCT/US2011/052340, Written Opinion mailed Feb. 29, 2012", 3 pgs.
"International Application Serial No. PCT/US2011/052369, International Preliminary Report on Patentability mailed Apr. 4, 2013", 5 pgs.
"International Application Serial No. PCT/US2013/021411, International Search Report mailed Apr. 30, 2013", 5 pgs.
"International Application Serial No. PCT/US2013/021411, Written Opinion mailed Apr. 30, 2013", 5 pgs.
"International Application Serial No. PCT/US2013/023877, International Search Report mailed May 14, 2013", 3 pgs.

(56) References Cited

OTHER PUBLICATIONS

"International Application Serial No. PCT/US2013/023877, Written Opinion mailed May 14, 2013", 5 pgs.
"International Application Serial No. PCT/US2013/024149, Written Opinion mailed", 4 pages.
"International ApplicationSerial No. PCT/US2013/024149, International Search Report mailed", 7 pages.
"T4020 & T4030 MEMS Microphones for Consumer Electronics", Product Brief 2010, Edition Feb. 2010, (2010), 2 pgs.
Acar, Cenk, et al., "Chapter 4: Mechanical Design of MEMS Gyroscopes", MEMS Vibratory Gyroscopes: Structural Approaches to Improve Robustness, Springer, (2009), 73-110.
Acar, Cenk, et al., "Chapter 6: Linear Multi DOF Architecture—Sections 6.4 and 6.5", MEMS Vibratory Gyroscopes: Structural Approaches to Improve Robustness, Springer, (2009), 158-178.
Acar, Cenk, et al., "Chapter 7: Torsional Multi-DOF Architecture", MEMS Vibratory Gyroscopes: Structural Approaches to Improve Robustness, Springer, (209), 187-206.
Acar, Cenk, et al., "Chapter 8: Distributed-Mass Architecture", MEMS Vibratory Gyroscopes: Structural Approaches to Improve Robustness, Springer, (2009), 207-224.
Acar, Cenk, et al., "Chapter 9: Conclusions and Future Trends", MEMS Vibratory Gyroscopes: Structural Approaches to Improve Robustness, Springer, (2009), 225-245.
Krishnamurthy, Rajesh, et al., "Drilling and Filling, but not in your Dentist's Chair a look at some recent history of multi-chip and through silicon via (TSV) technology", Chip Design Magazine, (Oct./Nov. 2008), 7 pgs.
"U.S. Appl. No. 12/849,742, Supplemental Notice of Allowability mailed Mar. 17, 2014", 3 pgs.
"U.S. Appl. No. 12/849,742, Supplemental Notice of Allowability mailed May 5, 2014", 2 pgs.
"U.S. Appl. No. 12/849,787, Supplemental Notice of Allowability mailed Mar. 21, 2014", 3 pgs.
"U.S. Appl. No. 13/362,955, Non Final Office Action mailed Apr. 15, 2014", 9 pgs.
"U.S. Appl. No. 13/363,537, Response filed Jun. 6, 2014 to Non Final Office Action mailed Feb. 6, 2014", 11 pgs.
"U.S. Appl. No. 13/742,942, Supplemental Notice of Allowability mailed Apr. 10, 2014", 2 pgs.
"U.S. Appl. No. 13/755,841, Notice of Allowance mailed May 7, 2014", 8 pgs.
"U.S. Appl. No. 13/755,841, Preliminary Amendment filed Oct. 10, 2013", 10 pgs.
"U.S. Appl. No. 13/755,841, Response filed Apr. 21, 2014 to Restriction Requirement mailed Feb. 21, 2014", 7 pgs.
"U.S. Appl. No. 13/821,589, Restriction Requirement mailed Apr. 11, 2014", 10 pgs.
"Chinese Application Serial No. 2010800423190, Office Action mailed Mar. 26, 2014", 10 pgs.
"Chinese Application Serial No. 201180053926.1, Response filed Apr. 29, 2014 to Office Action mailed Jan. 13, 2014", w/English Claims, 10 pgs.
"Chinese Application Serial No. 201180055029.4, Response filed May 27, 2014 to Office Action mailed Jan. 13, 2014", w/English Claims, 29 pgs.
"Chinese Application Serial No. 201180055309.5, Office Action mailed Mar. 31, 2014", w/English Claims, 7 pgs.
"Chinese Application Serial No. 201320172366.8, Response filed Mar. 18, 2014 to Office Action mailed Jan. 30, 2014", w/English Claims, 20 pgs.
"Chinese Application Serial No. 201320565239.4, Response filed Mar. 31, 2014 to Office Action mailed Jan. 16, 2014", w/English Claims, 38 pgs.
"European Application Serial No. 118260070.2, Office Action mailed Mar. 12, 2014", 1 pg.
"European Application Serial No. 11826070.2, Extended European Search Report mailed Feb. 21, 2014", 5 pgs.
"European Application Serial No. 11826071.0, Extended European Search Report mailed Feb. 20, 2014", 6 pgs.

"European Application Serial No. 11826071.0, Office Action mailed Mar. 12, 2014", 1 pg.
"European Application Serial No. 13001692.6, Response filed Apr. 1, 2014 to Extended European Search Report mailed Jul. 24, 2013", 19 pgs.
"European Application Serial No. 13001721.3, Response filed Apr. 7, 2014 to Extended European Search Report mailed Jul. 18, 2013", 25 pgs.
"Korean Application Serial No. 10-2013-7009777, Response filed Apr. 28, 2014", w/English Claims, 19 pgs.
"U.S. Appl. No. 13/813,443, Non Final Office Action mailed Jun. 10, 2015", 10 pgs.
"U.S. Appl. No. 13/813,443, Response filed May 22, 2015 to Restriction Requirement mailed Apr. 29, 2015", 7 pgs.
"U.S. Appl. No. 13/821,586, Notice of Allowance mailed Jun. 5, 2015", 6 pgs.
"U.S. Appl. No. 13/821,589, Final Office Action mailed Jul. 17, 2015", 14 pgs.
"U.S. Appl. No. 13/821,598, Non Final Office Action mailed Jul. 7, 2015", 9 pgs.
"U.S. Appl. No. 13/821,619, *Ex Parte Quayle* Action mailed Jul. 16, 2015", 8 pgs.
"U.S. Appl. No. 13/821,793, Non Final Office Action mailed Jul. 27, 2015", 14 pgs.
"U.S. Appl. No. 13/821,842, Response filed Jun. 18, 2015 Non Final Office Action mailed Mar. 18, 2015", 11 pgs.
"U.S. Appl. No. 13/821,853, Final Office Action mailed Jun. 18, 2015", 7 pgs.
"U.S. Appl. No. 14/023,869, Non Final Office Action mailed Jun. 15, 2015", 15 pgs.
"U.S. Appl. No. 14/658,579, Non Final Office Action mailed Jul. 1, 2015", 9 pgs.
"Chinese Application Serial No. 201180044919.5, Office Action mailed Jun. 25, 2015", w/English Translation, 8 pgs.
"Chinese Application Serial No. 201180054796.3, Office Action mailed Jun. 4, 2015", w/English Translation, 7 pgs.
"Chinese Application Serial No. 201310115550.3, Office Action mailed May 22, 2015", w/English Claims, 8 pgs.
"Chinese Application Serial No. 201310119986.X, Office Action mailed May 12, 2015", w/English Claims, 14 pgs.
"Chinese Application Serial No. 201380007588.7, Office Action mailed Jun. 10, 2015", w/English Claims, 7 pgs.
"Chinese Application Serial No. 201380007615.0, Office Action mailed May 6, 2015", w/English Claims, 7 pgs.
"U.S. Appl. No. 13/363,537, Final Office Action mailed Jun. 27, 2014", 8 pgs.
"U.S. Appl. No. 13/742,942, Notice of Allowance mailed Jan. 28, 2014", 8 pgs.
"U.S. Appl. No. 13/755,841, Supplemental Notice of Allowability Jun. 27, 2014", 2 pgs.
"U.S. Appl. No. 13/821,589, Non Final Office Action mailed Jul. 9, 2014", 10 pgs.
"U.S. Appl. No. 13/821,589, Response to Restriction Requirement mailed Apr. 11, 2014", 6 pgs.
"U.S. Appl. No. 13/821,598, Restriction Requirement mailed Aug. 15, 2014", 11 pgs.
"U.S. Appl. No. 13/821,612, Non Final Office Action mailed Jul. 23, 2014", 8 pgs.
"U.S. Appl. No. 13/821,853, Non Final Office Action mailed Jul. 30, 2014", 10 pgs.
"U.S. Appl. No. 13/860,761, Non Final Office Action mailed Aug. 19, 2014", 13 pgs.
"Chinese Application Serial No. 2010800423190, Response filed Aug. 11, 2014 to Office Action mailed Mar. 26, 2014", w/English Claims, 11 pgs.
"Chinese Application Serial No. 201180054796.3, Response filed Jun. 30, 2014 to Office Action mailed Jan. 16, 2014", w/English Claims, 3 pgs.
"Chinese Application Serial No. 201180055029.4, Office Action mailed Jul. 2, 2014", w/English Translation, 5 pgs.
"Chinese Application Serial No. 201180055309.5, Response filed Aug. 13, 2014 to Office Action mailed Mar. 31, 2014", w/English Claims, 27 pgs.

(56) References Cited

OTHER PUBLICATIONS

"Chinese Application Serial No. 201380007588.7, Notification to Make Rectification mailed Aug. 18, 2014", 2 pgs.
"Chinese Application Serial No. 201380007615.0, Notification to Make Rectification mailed Aug. 18, 2014", 2 pgs.
"European Application Serial No. 10806751.3, Response filed Jul. 24, 2014 to Office Action mailed Jan. 24, 2014", 26 pgs.
"European Application Serial No. 11826068.6, Extended European Search Report mailed Jul. 16, 2014", 10 pgs.
"European Application Serial No. 13001719.7, Extended European Search Report mailed Jun. 24, 2014", 10 pgs.
"International Application Serial No. PCT/US2013/021411, International Preliminary Report on Patentability mailed Aug. 14, 2014", 7 pgs.
"International Application Serial No. PCT/US2013/023877, International Preliminary Report on Patentability mailed Aug. 14, 2014", 7 pgs.
"International Application Serial No. PCT/US2013/024138, International Preliminary Report on Patentability mailed Aug. 14, 2014", 6 pgs.
"International Application Serial No. PCT/US2013/024149, International Preliminary Report on Patentability mailed Aug. 14, 2014", 6 pgs.
Xia, Guo-Ming, et al., "Phase correction in digital self-oscillation drive circuit for improve silicon MEMS gyroscope bias stability", Solid-State and Integrated Circuit Technology (ICSICT), 2010 10th IEEE International Conference on, IEEE, (Nov. 1, 2010), 1416-1418.
"U.S. Appl. No. 12/849,742, Response filed Sep. 30, 2013 to Non-Final Office Action mailed Mar. 28, 2013", 12 pgs.
"U.S. Appl. No. 12/849,787, Response filed Oct. 28, 2013 to Non Final Office Action mailed May 28, 2013", 12 pgs.
"Chinese Application Serial No. 201180053926.1, Amendment filed Aug. 21, 2013", w/English Translation, 13 pgs.
"Chinese Application Serial No. 201180055309.5, Voluntary Amendment filed Aug. 23, 2013", w/English Translation, 13 pgs.
"Chinese Application Serial No. 201320165465.3, Office Action mailed Jul. 22, 2013", w/English Translation, 2 pgs.
"Chinese Application Serial No. 201320165465.3, Response filed Aug. 7, 2013 to Office Action mailed Jul. 22, 2013", w/English Translation, 39 pgs.
"Chinese Application Serial No. 201320171504.0, Office Action mailed Jul. 22, 2013", w/English Translation, 3 pgs.
"Chinese Application Serial No. 201320171504.0, Response filed Jul. 25, 2013 to Office Action mailed Jul. 22, 2013", w/English Translation, 33 pgs.
"Chinese Application Serial No. 201320171616.6, Office Action mailed Jul. 10, 2013", w/English Translation, 2 pgs.
"Chinese Application Serial No. 201320171757.8, Office Action mailed Jul. 11, 2013", w/English Translation, 2 pgs.
"Chinese Application Serial No. 201320171757.8, Response filed Jul. 25, 2013 to Office Action mailed Jul. 11, 2013", w/English Translation, 21 pgs.
"Chinese Application Serial No. 201320171757.8, Response filed Jul. 26, 2013 to Office Action mailed Jul. 10, 2013", w/English Translation, 40 pgs.
"Chinese Application Serial No. 201320172128.7, Office Action mailed Jul. 12, 2013", w/English Translation, 3 pgs.
"Chinese Application Serial No. 201320172128.7, Response filed Aug. 7, 2013 to Office Action mailed Jul. 12, 2013", w/English Translation, 39 pgs.
"Chinese Application Serial No. 201320172366.8, Office Action mailed Jul. 9, 2013", w/English Translation, 3 pgs.
"Chinese Application Serial No. 201320172366.8, Response filed Sep. 16, 2013 to Office Action mailed Jul. 9, 2013", w/English Translation, 24 pgs.
"Chinese Application Serial No. 201320172367.2, Office Action mailed Jul. 9, 2013", w/English Translation, 2 pgs.

"Chinese Application Serial No. 201320172367.2, Response filed Sep. 16, 2013 to Office Action mailed Jul. 9, 2013", w/English Translation, 24 pgs.
"Chinese Application Serial No. 201320185461.1, Office Action mailed Jul. 23, 2013", w/English Translation, 3 pgs.
"Chinese Application Serial No. 201320185461.1, Response filed Sep. 10, 2013 to Office Action mailed Jul. 23, 2013", w/English Translation, 25 pgs.
"Chinese Application Serial No. 201320186292.3, Office Action mailed Jul. 19, 2013", w/English Translation, 2 pgs.
"Chinese Application Serial No. 201320186292.3, Response filed Sep. 10, 2013 to Office Action mailed Jul. 19, 2013", w/English Translation, 23 pgs.
"European Application Serial No. 13001692.6, European Search Report mailed Jul. 24, 2013", 5 pgs.
"European Application Serial No. 13001696.7, Extended European Search Report mailed Aug. 6, 2013", 4 pgs.
"European Application Serial No. 13001721.3, European Search Report mailed Jul. 18, 2013", 9 pgs.
"International Application Serial No. PCT/US2013/024138, International Search Report mailed May 24, 2013", 3 pgs.
"International Application Serial No. PCT/US2013/024138, Written Opinion mailed May 24, 2013", 4 pgs.
"Korean Application Serial No. 10-2013-7009775, Office Action mailed Sep. 17, 2013", w/English Translation, 6 pgs.
"Korean Application Serial No. 10-2013-7009777, Office Action mailed Sep. 17, 2013", w/English Translation, 8 pgs.
"Korean Application Serial No. 10-2013-7009788, Office Action mailed Aug. 29, 2013", w/English Translation, 6 pgs.
"Korean Application Serial No. 10-2013-7009790, Office Action mailed Jun. 26, 2013", W/English Translation, 7 pgs.
"Korean Application Serial No. 10-2013-7009790, Response filed Aug. 26, 2013 to Office Action mailed Jun. 26, 2013", w/English Claims, 11 pgs.
"Korean Application Serial No. 10-2013-7010143, Office Action mailed May 28, 2013", w/English Translation, 5 pgs.
"Korean Application Serial No. 10-2013-7010143, Response filed Jul. 24, 2013 to Office Action mailed May 28, 2013", w/English Claims, 14 pgs.
Ferreira, Antoine, et al., "A Survey of Modeling and Control Techniques for Micro- and Nanoelectromechanical Systems", IEEE Transactions on Systems, Man and Cybernetics—Part C: Applications and Reviews vol. 41, No. 3., (May 2011), 350-364.
Fleischer, Paul E, "Sensitivity Minimization in a Single Amplifier Biquad Circuit", IEEE Transactions on Circuits and Systems. vol. Cas-23, No. 1, (1976), 45-55.
Reljin, Branimir D, "Properties of SAB filters with the two-pole single-zero compensated operational amplifier", Circuit Theory and Applications: Letters to the Editor. vol. 10, (1982), 277-297.
Sedra, Adel, et al., "Chapter 8.9: Effect of Feedback on the Amplifier Poles", Microelectronic Circuits, 5th edition, (2004), 836-864.
Song-Hee, Cindy Paik, "A MEMS-Based Precision Operational Amplifier", Submitted to the Department of Electrical Engineering and Computer Sciences MIT, [Online]. Retrieved from the Internet: <URL: http://dspace.mit.edu/bitstream/handle/1721.1/16682/57138272.pdf?...>, (Jan. 1, 2004), 123 pgs.
"U.S. Appl. No. 13/362,955, Final Office Action mailed Nov. 19, 2014", 5 pgs.
"U.S. Appl. No. 13/362,955, Response filed Aug. 15, 2014 to Non Final Office Action mailed May 15, 2014", 13 pgs.
"U.S. Appl. No. 13/363,537, Examiner Interview Summary mailed Sep. 29, 2014", 3 pgs.
"U.S. Appl. No. 13/363,537, Notice of Allowance mailed Nov. 7, 2014", 5 pgs.
"U.S. Appl. No. 13/363,537, Response filed Sep. 29, 2014 to Final Office Action mailed Jun. 27, 2014", 9 pgs.
"U.S. Appl. No. 13/821,586, Response filed Nov. 24, 2014 to Restriction Requirement mailed Sep. 22, 2014", 6 pgs.
"U.S. Appl. No. 13/821,586, Restriction Requirement mailed Sep. 22, 2014", 4 pgs.
"U.S. Appl. No. 13/821,589, Response filed Nov. 10, 2014 to Non Final Office Action mailed Jul. 9, 2014", 15 pgs.

(56) References Cited

OTHER PUBLICATIONS

"U.S. Appl. No. 13/821,598, Non Final Office Action mailed Nov. 20, 2014", 9 pgs.
"U.S. Appl. No. 13/821,598, Response filed Oct. 15, 2014 to Restriction Requirement mailed Aug. 15, 2014", 8 pgs.
"U.S. Appl. No. 13/821,612, Response filed Oct. 23, 2014 to Non Final Office Action mailed Jul. 23, 2014", 6 pgs.
"Chinese Application Serial No. 201180054796.3, Office Action mailed Sep. 4, 2014", w/English Claims, 11 pgs.
"Chinese Application Serial No. 201180055029.4, Response filed Nov. 14, 2014 to Office Action mailed Jul. 2, 2014", w/English Claims, 23 pgs.
"Chinese Application Serial No. 201310118845.6, Office Action mailed Sep. 9, 2014", 8 pgs.
"Chinese Application Serial No. 201310119472.4, Office Action mailed Sep. 9, 2014", w/English Translation, 11 pgs.
"European Application Serial No. 11826043.9, Office Action mailed May 6, 2013", 2 pgs.
"European Application Serial No. 11826043.9, Response filed Nov. 4, 2013 to Office Action mailed May 6, 2013", 6 pgs.
"European Application Serial No. 11826067.8, Extended European Search Report mailed Oct. 6, 2014", 10 pgs.
"European Application Serial No. 11826070.2, Response filed Sep. 19, 2014 to Office Action mailed Mar. 12, 2014", 11 pgs.
"European Application Serial No. 11826071.0, Response filed Sep. 19, 2014 to Office Action mailed Mar. 12, 2014", 20 pgs.
"European Application Serial No. 11827347.3, Office Action mailed May 2, 2013", 6 pgs.
"European Application Serial No. 11827347.3, Response filed Oct. 30, 2013 to Office Action mailed May 2, 2013", 9 pgs.
"European Application Serial No. 11827384.6, Extended European Search Report mailed Nov. 12, 2014", 6 pgs.
"European Application Serial No. 13001695.9, European Search Report mailed Oct. 5, 2014", 6 pgs.
Dunn, C, et al., "Efficient linearisation of sigma-delta modulators using single-bit dither", Electronics Letters 31(12), (Jun. 1995), 941-942.
Kulah, Haluk, et al., "Noise Analysis and Characterization of a Sigma-Delta Capacitive Silicon Microaccelerometer", 12th International Conference on Solid State Sensors, Actuators and Microsystems, (2003), 95-98.
Sherry, Adrian, et al., "AN-609 Application Note: Chopping on Sigma-Delta ADCs", Analog Devices, [Online]. Retrieved from the Internet: <URL: http://www.analog.com/static/imported-files/application_notes/AN-609.pdf>, (2003), 4 pgs.
"U.S. Appl. No. 12/849,742, Notice of Allowance mailed Nov. 29, 2013", 7 pgs.
"U.S. Appl. No. 12/849,787, Notice of Allowance mailed Dec. 11, 2013", 9 pgs.
"U.S. Appl. No. 13/362,955, Response filed Feb. 17, 2014 to Restriction Requirement mailed Dec. 17, 2013", 9 pgs.
"U.S. Appl. No. 13/362,955, Restriction Requirement mailed Dec. 17, 2013", 6 pgs.
"U.S. Appl. No. 13/363,537, Non Final Office Action mailed Feb. 2, 2014", 10 pgs.
"U.S. Appl. No. 13/742,942, Notice of Allowance mailed Jan. 28, 2014", 9 pgs.
"U.S. Appl. No. 13/746,016, Notice of Allowance mailed Jan. 17, 2014", 10 pgs.
"U.S. Appl. No. 13/755,841, Restriction Requirement mailed Feb. 21, 2014", 6 pgs.
"Chinese Application Serial No. 201180053926.1, Office Action mailed Jan. 13, 2014", 7 pgs.
"Chinese Application Serial No. 201180054796.3, Office Action mailed Jan. 16, 2014", 8 pgs.
"Chinese Application Serial No. 201180055029.4, Office Action mailed Jan. 13, 2014", 7 pgs.
"Chinese Application Serial No. 201320172366.8, Office Action mailed Jan. 30, 2014", 3 pgs.
"Chinese Application Serial No. 201320172366.8, Office Action mailed Oct. 25, 2013", 8 pgs.
"Chinese Application Serial No. 201320172366.8, Response filed Dec. 24, 2013 to Office Action mailed Oct. 25, 2013", 11 pgs.
"Chinese Application Serial No. 201320565239.4, Office Action mailed Jan. 16, 2014", w/English Translation, 3 pgs.
"European Application Serial No. 10806751.3, Extended European Search Report mailed Jan. 7, 2014", 7 pgs.
"Korean Application Serial No. 10-2013-0109990, Amendment filed Dec. 10, 2013", 4 pgs.
"Korean Application Serial No. 10-2013-7009775, Office Action mailed Dec. 27, 2013", 8 pgs.
"Korean Application Serial No. 10-2013-7009775, Response filed Oct. 29, 2013 to Office Action mailed Sep. 17, 2013", w/English Claims, 23 pgs.
"Korean Application Serial No. 10-2013-7009777, Office Action mailed Jan. 27, 2014", 5 pgs.
"Korean Application Serial No. 10-2013-7009777, Response filed Nov. 5, 2013 to Office Action mailed Sep. 17, 2013", 11 pgs.
"Korean Application Serial No. 10-2013-7009788, Office Action mailed Dec. 27, 2013", w/English Translation, 10 pgs.
"Korean Application Serial No. 10-2013-7009788, Response filed Oct. 29, 2013 to Office Action mailed Aug. 29, 2013", w/English Claims, 22 pgs.
"U.S. Appl. No. 13/742,994, Final Office Action mailed Nov. 24, 2015", 11 pgs.
"U.S. Appl. No. 13/742,994, Notice of Allowability mailed Sep. 1, 2016", 7 pgs.
"U.S. Appl. No. 13/742,994, Notice of Allowance mailed Jun. 21, 2016", 8 pgs.
"U.S. Appl. No. 13/742,994, Response filed Jan. 8, 2016 to Final Office Action mailed Nov. 24, 2015", 8 pgs.
"U.S. Appl. No. 13/755,953, Notice of Allowance mailed Oct. 28, 2015", 5 pgs.
"U.S. Appl. No. 13/755,953, Response filed Sep. 15, 2015 to Non Final Office Action mailed May 14, 2015", 10 pgs.
"U.S. Appl. No. 13/813,443, Notice of Allowance mailed Feb. 4, 2016", 7 pgs.
"U.S. Appl. No. 13/813,443, Response filed Oct. 13, 2015 to Non Final Office Action mailed Jun. 10, 2015", 7 pgs.
"U.S. Appl. No. 13/821,589, Non Final Office Action mailed Feb. 8, 2016", 9 pgs.
"U.S. Appl. No. 13/821,589, Non Final Office Action mailed Sep. 9, 2016", 7 pgs.
"U.S. Appl. No. 13/821,589, Response filed May 9, 2016 to Non Final Office Action mailed Feb. 8, 2016", 7 pgs.
"U.S. Appl. No. 13/821,589, Response filed Oct. 19, 2015 to Final Office Action mailed Jul. 17, 2015", 10 pgs.
"U.S. Appl. No. 13/821,598, Examiner Interview Summary mailed Jul. 21, 2016", 2 pgs.
"U.S. Appl. No. 13/821,598, Examiner Interview Summary mailed Jul. 28, 2016", 2 pgs.
"U.S. Appl. No. 13/821,598, Final Office Action mailed Jan. 21, 2016", 9 pgs.
"U.S. Appl. No. 13/821,598, Response filed Oct. 7, 2015 to Non Final Office Action mailed Jul. 7, 2015", 10 pgs.
"U.S. Appl. No. 13/821,619, Non Final Office Action mailed Oct. 13, 2015", 11 pgs.
"U.S. Appl. No. 13/821,619, Response filed Sep. 16, 2015 to *Ex Parte Quayle* Action mailed Jul. 16, 2015", 11 pgs.
"U.S. Appl. No. 13/821,793, Notice of Allowance mailed Nov. 24, 2015", 5 pgs.
"U.S. Appl. No. 13/821,793, Response filed Oct. 27, 2015 to Non Final Office Action mailed Jul. 27, 2015", 12 pgs.
"U.S. Appl. No. 13/821,842, Corrected Notice of Allowance mailed Oct. 19, 2015", 2 pgs.
"U.S. Appl. No. 13/821,842, Examiner Interview Summary mailed Sep. 15, 2015", 3 pgs.
"U.S. Appl. No. 13/821,842, Notice of Allowance Received mailed Sep. 15, 2015", 13 pgs.
"U.S. Appl. No. 13/821,842, Supplemental Notice of Allowability mailed Sep. 28, 2015", 2 pgs.

(56) References Cited

OTHER PUBLICATIONS

"U.S. Appl. No. 13/821,853, Final Office Action mailed Jan. 25, 2016", 6 pgs.
"U.S. Appl. No. 13/821,853, Notice of Allowance mailed May 20, 2016", 8 pgs.
"U.S. Appl. No. 13/821,853, Response filed Apr. 25, 2016 to Final Office Action Mailed Jan. 25, 2016", 7 pgs.
"U.S. Appl. No. 13/821,853, Response filed Oct. 19, 2015 to Final Office Action mailed Jun. 18, 2015", 8 pgs.
"U.S. Appl. No. 13/857,349, Non Final Office Action mailed Oct. 8, 2015", 10 pgs.
"U.S. Appl. No. 13/857,349, Notice of Allowance mailed May 6, 2016", 9 pgs.
"U.S. Appl. No. 13/857,349, Response filed Jan. 8, 2016 to Non Final Office Action mailed Oct. 8, 2015", 10 pgs.
"U.S. Appl. No. 13/857,377, Non Final Office Action mailed Apr. 27, 2016".
"U.S. Appl. No. 13/857,377, Non Final Office Action mailed Oct. 13, 2016", 23 pgs.
"U.S. Appl. No. 13/857,377, Response filed Jul. 27, 2016 to Non Final Office Action mailed Apr. 27, 2016", 14 pgs.
"U.S. Appl. No. 13/860,780, Final Office Action mailed Aug. 18, 2016", 25 pgs.
"U.S. Appl. No. 13/860,780, Non Final Office Action mailed Apr. 14, 2016", 25 pgs.
"U.S. Appl. No. 13/860,780, Response filed Jul. 14, 2016 to Non Final Office Action mailed Apr. 14, 2016", 12 pgs.
"U.S. Appl. No. 13/860,780, Response Filed Nov. 18, 2016 to Final Office Action Mailed Aug. 18, 2016", 7 pgs.
"U.S. Appl. No. 14/023,869 Response Filed Apr. 15, 2016 to Final Office Action mailed Dec. 15, 2015", 12 pgs.
"U.S. Appl. No. 14/023,869, Examiner Interview Summary mailed Apr. 19, 2016", 3 pgs.
"U.S. Appl. No. 14/023,869, Final Office Action mailed Dec. 15, 2015", 14 pgs.
"U.S. Appl. No. 14/023,869, Notice of Allowance mailed May 4, 2016", 8 pgs.
"U.S. Appl. No. 14/023,869, Preliminary Amendment filed Dec. 4, 2013", 3 pgs.
"U.S. Appl. No. 14/023,869, Response filed Nov. 16, 2015 to Non Final Office Action mailed Jun. 15, 2015", 12 pgs.
"U.S. Appl. No. 14/217,842, Non Final Office Action mailed Sep. 9, 2016", 10 pgs.
"U.S. Appl. No. 14/658,579, Advisory Action mailed Oct. 26, 2016", 3 pgs.
"U.S. Appl. No. 14/658,579, Final Office Action mailed Jul. 14, 2016", 6 pgs.
"U.S. Appl. No. 14/658,579, Final Office Action mailed Oct. 21, 2015", 10 pgs.
"U.S. Appl. No. 14/658,579, Non Final Office Action mailed Mar. 16, 2016", 5 pgs.
"U.S. Appl. No. 14/658,579, Notice of Allowance mailed Nov. 2, 2016", 5 pgs.
"U.S. Appl. No. 14/658,579, Response Filed Oct. 14, 2016 to Final Office Action mailed Jul. 14, 2016", 9 pgs.
"U.S. Appl. No. 14/658,579, Response filed Feb. 22, 2016 to Final Office Action mailed Oct. 21, 2015", 11 pgs.
"U.S. Appl. No. 14/658,579, Response Filed Jun. 16, 2016 to Non-Final Office Action Mailed Mar. 16, 2016", 9 pgs.
"U.S. Appl. No. 14/658,579, Response filed Oct. 1, 2015 to Non Final Office Action mailed Jul. 1, 2015", 11 pgs.
"U.S. Appl. No. 14/658,579, Response filed Oct. 20, 2016 to Final Office Action mailed Jul. 14, 2016", 9 pgs.
"U.S. Appl. No. 15/005,783 Preliminary Amendment Filed May 26, 2016", 9 pgs.
"U.S. Appl. No. 15/218,852, Preliminary Amendment filed Jul. 27, 2016", 7 pgs.
"U.S. Appl. No. 13/742,994, Response filed Jul. 31, 2015 to Non Final Office Action mailed May 1, 2015", 12 pgs.
"Chinese Application Serial No. 201180044919.5, Office Action mailed Apr. 25, 2016", w/ English Translation, 7 pgs.
"Chinese Application Serial No. 201180044919.5, Response filed Jan. 11, 2016 to Office Action mailed Jun. 25, 2015", with English machine translation, 22 pgs.
"Chinese Application Serial No. 201180044919.5, Response filed May 12, 2016 to Office Action mailed Apr. 25, 2016", w/ English Translation, 13 pgs.
"Chinese Application Serial No. 201180055630.3, Office Action mailed May 16, 2016", (English Translation), 9 pgs.
"Chinese Application Serial No. 201180055630.3, Office Action mailed Jul. 10, 2015", w/ English Claims, 8 pgs.
"Chinese Application Serial No. 201180055630.3, Office Action mailed Dec. 7, 2015", W/ English Translation, 5 pgs.
"Chinese Application Serial No. 201180055630.3, Response filed Feb. 19, 2016 to Office Action mailed Dec. 7, 2015", w/ English Translation of Claims, 10 pgs.
"Chinese Application Serial No. 201180055630.3, Response filed Sep. 25, 2015 to Office Action mailed Jul. 10, 2015", w/ English Claims, 14 pgs.
"Chinese Application Serial No. 201180055630.3, Response filed Sep. 26, 2016 to Office Action mailed May 16, 2016", (With English Translation), 15 pgs.
"Chinese Application Serial No. 201180055792.7, Office Action mailed Jul. 21, 2015", w/ English Translation, 5 pgs.
"Chinese Application Serial No. 201180055794.6, Voluntary Amendment filed Jul. 7, 2015", with English translation of claims, 9 pgs.
"Chinese Application Serial No. 201180055823.9, Office Action mailed May 10, 2016", w/ English Translation, 8 pgs.
"Chinese Application Serial No. 201180055823.9, Office Action mailed Nov. 17, 2015", w/ English Translation, 8 pgs.
"Chinese Application Serial No. 201180055823.9, Response filed Feb. 2, 2016 to Office Action mailed Nov. 17, 2015", (English Translation of Claims), 15 pgs.
"Chinese Application Serial No. 201180055823.9, Response filed Jul. 25, 2016 to Office Action mailed May 10, 2016", with English translation of claims, 17 pgs.
"Chinese Application Serial No. 201180055823.9,Response filed Aug. 3, 2015 to Office Action mailed Mar. 19, 2015", w/ English Translation, 14 pgs.
"Chinese Application Serial No. 201180055845.5, Office Action mailed Aug. 5, 2015", w/ English Translation, 5 pgs.
"Chinese Application Serial No. 201180055845.5, Response filed Nov. 20, 2015 to Office Action mailed Aug. 5, 2015", With English Claims, 9 pgs.
"Chinese Application Serial No. 201180055845.5,Response filed Jul. 13, 2015 to Office Action mailed Mar. 4, 2015", w/ English Translation, 17 pgs.
"Chinese Application Serial No. 201310115550.3, Response filed Sep. 30, 2015 to Office Action mailed May 22, 2015", w/ English Claims, 15 pgs.
"Chinese Application Serial No. 201310119730.9, Office Action mailed Jan. 29, 2016", w/ English Translation, 7 pgs.
"Chinese Application Serial No. 201310119730.9, Office Action mailed Oct. 10, 2016", W/ English Translation, 8 pgs.
"Chinese Application Serial No. 201310119730.9, Response filed Jun. 13, 2016 to Office Action mailed Jan. 29, 2016", with English translation of claims, 19 pgs.
"Chinese Application Serial No. 201310119730.9, Response filed Sep. 18, 2015 to Office Action mailed May 4, 2015", with English machine translation, 12 pgs.
"Chinese Application Serial No. 201310119806.8, Office Action mailed May 13, 2016", with English translation of claims, 11 pgs.
"Chinese Application Serial No. 201310119806.8, Office Action mailed Jul. 3, 2015", w/ English Claims, 12 pgs.
"Chinese Application Serial No. 201310119806.8, Response filed Jan. 18, 2016 to Office Action mailed Jul. 3, 2015", (English Translation of Claims), 11 pgs.
"Chinese Application Serial No. 201310119806.8, Response filed Sep. 28, 2016 to Office Action mailed May 13, 2016", with English translation of claims, 13 pgs.

(56) References Cited

OTHER PUBLICATIONS

"Chinese Application Serial No. 201310119986.X, Office Action mailed Dec. 18, 2015", w/ English Translation, 6 pgs.
"Chinese Application Serial No. 201310119986.X, Response filed Apr. 29, 2016 to Office Action mailed Dec. 18, 2015", (English Translation of Claims), 14 pgs.
"Chinese Application Serial No. 201310119986.X, Response filed Sep. 25, 2015 to Office Action mailed May 12, 2015", w/ English Claims, 7 pgs.
"Chinese Application Serial No. 201310120172.8, Office Action mailed Aug. 1, 2016", with English translation of claims, 19 pgs.
"Chinese Application Serial No. 201310120172.8, Office Action mailed Nov. 3, 2015", w/ English Translation, 11 pgs.
"Chinese Application Serial No. 201310120172.8, Response filed May 18, 2016 to Office Action mailed Nov. 3, 2015", with English translation of claims, 21 pgs.
"Chinese Application Serial No. 201310120172.8, Response filed Oct. 17, 2016 to Office Action mailed Aug. 1, 2016", with English translation of claims, 20 pgs.
"Chinese Application Serial No. 201310127961.4, Response filed Sep. 2, 2015 to Office Action mailed May 6, 2015", w/ English Claims, 19 pgs.
"Chinese Application Serial No. 201310128046.7, Office Action mailed Jul. 23, 2015", w/ English Translation, 7 pgs.
"Chinese Application Serial No. 201310128046.7, Response filed Oct. 14, 2015 to Office Action mailed Jul. 23, 2015", w/ English Claims, 23 pgs.
"Chinese Application Serial No. 201310415336.X, Office Action mailed Apr. 26, 2016", w/ English Translation, 11 pgs.
"Chinese Application Serial No. 201310415336.X, Office Action mailed Jul. 3, 2015", w/ English Claims, 9 pgs.
"Chinese Application Serial No. 201310415336.X, Response filed Jan. 18, 2016 to Office Action mailed Jul. 3, 2015", (English Translation of Claims), 11 pgs.
"Chinese Application Serial No. 201310415336.X, Response filed Sep. 12, 2016 to Office Action mailed Apr. 26, 2016", W/ English Translation of Claims, 13 pgs.
"Chinese Application Serial No. 201380007523.2, Office Action mailed Oct. 9, 2016", with English translation of claims, 7 pgs.
"Chinese Application Serial No. 201380007523.2, Office Action mailed Dec. 31, 2015", w/ English Translation, 12 pgs.
"Chinese Application Serial No. 201380007523.2, Response filed May 31, 2016 to Office Action mailed Dec. 31, 2015", with English translation of claims, 16 pgs.
"Chinese Application Serial No. 201380007577.9, Office Action mailed Aug. 18, 2016", with English translation of claims, 7 pgs.
"Chinese Application Serial No. 201380007577.9, Office Action mailed Dec. 21, 2015", w/ English Translation, 9 pgs.
"Chinese Application Serial No. 201380007577.9, Response filed May 5, 2016 to Office Action mailed Dec. 21, 2015", w/ English Claims, 17 pgs.

"Chinese Application Serial No. 201380007577.9, Response filed Nov. 2, 2016 to Office Action mailed Aug. 18, 2016", 5 pgs.
"Chinese Application Serial No. 201380007588.7, Response filed Oct. 26, 2015 to Office Action mailed Jun. 10, 2015", w/ English Claims, 9 pgs.
"Chinese Application Serial No. 201380007615.0, Response filed Jan. 5, 2016 to Office Action mailed May 6, 2015", w/ English Claims, 13 pgs.
"Chinese Application U.S. Appl. No. 201380007615.0, Response filed Nov. 23, 2015 to Office Action mailed May 6, 2015", With English Claims, 15 pgs.
"Definition of baseband signal downloaded from "Tech Terms"", (Jul. 15, 2016), 1 pg.
"European Application Serial No. 11826043.9, Extended European Search Report mailed Feb. 23, 2016", 6 pgs.
"European Application Serial No. 11826069.4, Extended European Search Report mailed Jul. 23, 2015", 8 pgs.
"European Application Serial No. 11826069.4, Response filed Feb. 22, 2016 to Extended European Search Report mailed Jul. 23, 2015", W/ English Translation, 26 pgs.
"European Application Serial No. 11827347.3, Extended European Search Report mailed Jul. 31, 2015", 6 pgs.
"European Application Serial No. 11827357.2, Communication under Rule 71(3) mailed Apr. 25, 2016", 36 pgs.
"European Application Serial No. 11827357.2, Extended European Search Report mailed Aug. 26, 2015", 4 pgs.
"European Application Serial No. 13001694.2, Extended European Search Report mailed Oct. 2, 2015", 8 pgs.
"European Application Serial No. 13001694.2, Response filed Apr. 26, 2016 to Office Action mailed Oct. 2, 2015", 18 pgs.
"European Application Serial No. 13001695.9, Response filed Aug. 24, 2015 to Extended European Search Report mailed Jan. 22, 2015", 9 pgs.
"European Application Serial No. 13001719.7, Communication Pursuant to Article 94(3) EPC mailed Jul. 4, 2016", 4 pgs.
"European Application Serial No. 13001720.5, Extended European Search Report mailed Aug. 20, 2015", 7 pgs.
"European Application Serial No. 13001917.7, Extended European Search Report mailed Apr. 11, 2016", 5 pgs.
"European Application Serial No. 13001918.5, Extended European Search Report mailed Dec. 3, 2015", 8 pgs.
"European Application Serial No. 13001918.5, Response filed Jul. 8, 2016 tp Office Action mailed Dec. 3, 2015", 36 pgs.
"Explanation of phase shifters from "Microwaves 101"", (Aug. 4, 2016), 5 pgs.
"Korean Application Serial No. 10-2013-0036907, Amendment filed Jul. 21, 2015", with English translation of claims, 12 pgs.
"Korean Application Serial No. 2012-7005729, Office Action mailed May 3, 2016", w/ English Claims, 11 pgs.
"Korean Application Serial No. 2012-7005729, Response filed Jun. 29, 2016 to Office Action mailed May 3, 2016", (English Translation of Claims), 29 pgs.

\* cited by examiner

MEMS DEVICE AUTOMATIC-GAIN CONTROL LOOP FOR MECHANICAL AMPLITUDE DRIVE

CLAIM OF PRIORITY

This application claims the benefit of priority to U.S. Provisional Patent Application Ser. No. 61/620,641, filed Apr. 5, 2012, hereby incorporated by reference herein in its entirety.

OVERVIEW

This document discusses, among other things, apparatus and methods for digital automatic gain control for driving a MEMS device, such as a proof mass. In an example, an apparatus can include a driver configured to oscillate a proof mass of a MEMS device, a charge-to-voltage (C2V) converter configured to provide oscillation information of the proof mass, an analog-to-digital converter (ADC) configured to provide a digital representation of the oscillation information, and a digital, automatic gain control circuit to provide oscillation amplitude error information using a comparison of the oscillation information to target amplitude information, and to provide a digital drive command signal using an amplified representation of the oscillation amplitude error information.

This overview is intended to provide a general overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

MEMS gyroscopes provide motion detection and measurement signals using deflections of a vibrating proof mass. The deflections are caused by a combination of movement of the vibrating proof mass, for example a proof mass of a gyroscope, and resulting Coriolis forces. Robust performance of a MEMS gyroscope can depend on the stability of the proof mass oscillations. The present inventors have recognized automatic gain control (AGC) apparatus and methods for driving a proof mass to oscillate with a stable amplitude at a resonant frequency of the proof mass. In certain examples an AGC loop can adjust an electrostatic force pumping into a MEMS gyroscope through drive electrodes such that the mechanical oscillation amplitude of the proof mass of the gyroscope is observed and maintained at a programmable target value. In some examples, the AGC loop can include an architecture that allows sensing the oscillation of the proof mass with very low noise and processing of the loop operations can be completed in a noise-less, digital environment.

Figure 1:
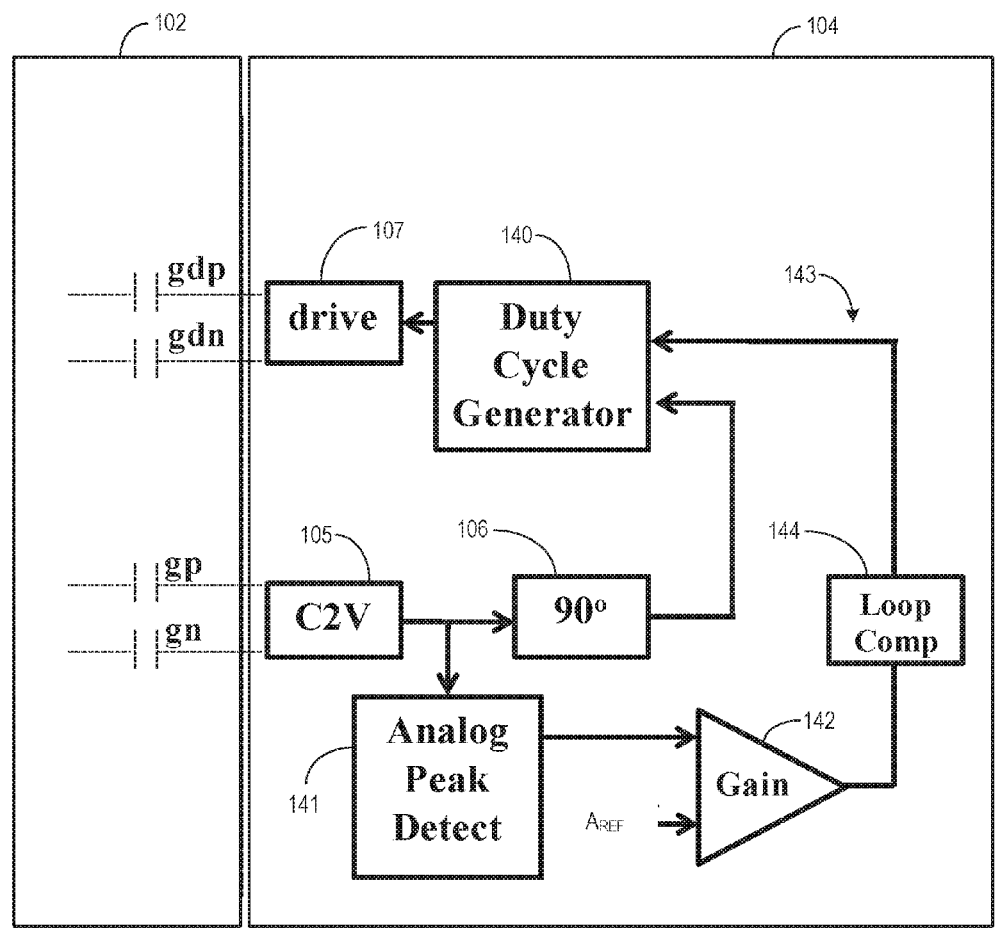
FIG. 1 illustrates an analog control circuit coupled to a MEMS gyroscope.

FIG. 1 illustrates an analog control circuit 104 coupled to a MEMS gyroscope 102. The MEMS gyroscope 102 can include drive electrodes (gdp, gdn) and drive sense electrodes (gp, gn) for coupling the analog control circuit 104 to the MEMS gyroscope 102. The analog control circuit 104 can drive a proof mass of the MEMS gyroscope into oscillation using a driver circuit 107 coupled to the drive electrodes (gdp, gdn) of the MEMS gyroscope 102. The analog control circuit 104 can receive proof mass position information using the drive sense electrodes (gp, gn) of the MEMS gyroscope and a drive sense charge-to-voltage (C2V) converter 105 of the analog control circuit 104. A phase shifter 106 can provide phase shifted position information of the proof mass to a duty cycle generator 140 of the analog control circuit 104 to generate a command signal for the driver circuit 107. In certain examples, the phase shifter 106 can provide phase shift to sustained oscillation of the proof mass of the MEMS gyroscope 102. An analog peak detector 141 can also receive the proof mass position information and can provide amplitude information about the proof mass oscillations. An analog comparator 142 can compare the amplitude information to a desired amplitude reference ($A_{REF}$), and can provide an amplitude error signal including amplitude error information, or oscillation amplitude error information. In some examples, the analog comparator 142 can include a gain setting to scale the amplitude error signal. A feedback loop 143 of the analog control circuit 104 can use a loop compensation module 144 to further compensate the amplitude error information to assist the duty cycle generator 140 in generating a control signal for the driver circuit 107. In response to the control signal, the driver circuit 107 can drive the proof mass of the MEMS gyroscope 102 into oscillation at a resonant frequency and with stable oscillation amplitude.

Figure 2:
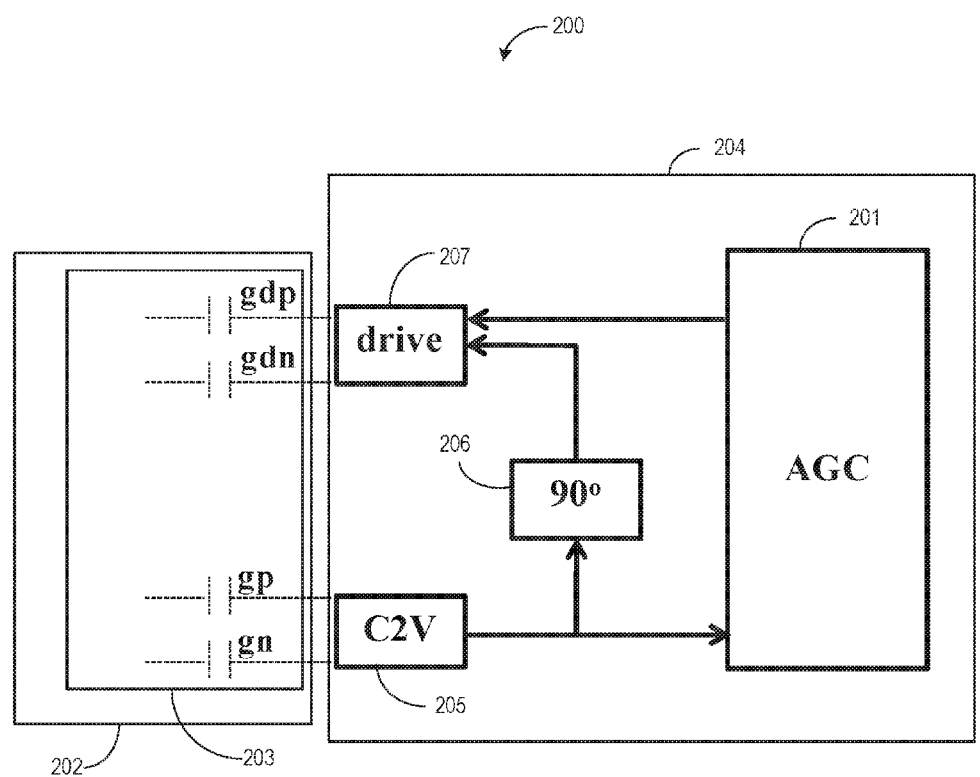
FIG. 2 illustrates generally a block diagram of an example MEMS gyroscope system.

FIG. 2 illustrates generally a block diagram of an MEMS gyroscope system 200 including an example digital, automatic gain control (AGC) circuit 201. The MEMS gyroscope system 200 can include a MEMS gyroscope 202 including a proof mass 203 such as a suspended proof mass, and a MEMS control circuit 204. In certain examples, the MEMS control circuit 204 can include a sense charge-to-voltage (C2V) converter 205, a phase shift circuit 206, a drive circuit 207, and the AGC circuit 201. The AGC circuit 201 can provide a command signal to the drive circuit 207 to drive the proof mass 203 of the MEMS gyroscope 202 into oscillation at a resonant frequency of the proof mass 203. In certain examples, the proof mass 203 can have a resonant frequency at about 20 kHz. It is understood that a proof mass can have a resonant frequency other than about 20 kHz without departing from the scope of the present subject matter. The drive sense C2V 205 can be couple to drive sense electrodes (gp, gn) of the proof mass 203 of the MEMS gyroscope 202. The drive sense electrodes (gp, gn) can provide a differential capacitive charge signal indicative of the actual oscillation of the proof mass 203. The differential capacitive charge signal can be used to provide phase and amplitude feedback to the drive circuit 207. It is understood that a proof mass can include a single sense signal to provide a non-differential capacitive charge signal without departing from the scope of the present subject matter. In certain examples, the drive circuit 207 can provide a power control signal to vibrate the proof mass of the MEMS gyroscope. In some examples, the drive circuit 207 can provide a power control signal to one or more proof mass drive electrodes (gdp. gdn) to vibrate the proof mass at a resonant frequency. In some examples, the drive circuit 207 can provide a power control signal to one or more proof mass drive electrodes (gdp. gdn) to vibrate the proof mass using electrostatic actuation. In certain examples, the drive sense C2V converter 205 can provide capacitive sensed position information of the proof mass 203 as the proof mass 203 vibrates. In an example, a phase shift circuit 206 can introduce a phase shift of (90) degrees to the output of the drive sense C2V converter 205 to ensure oscillation (or vibration) of the proof mass 203. Accordingly, the drive circuit 207 can receive the phase shifted output from phase shift circuit 206 to drive the proof mass 203. In certain examples, a phase shift of 360 degrees can be achieve through a loop of the MEMS gyroscope system 200 to ensure oscillation of the proof mass 203. In an example, drive sense C2V converter 205 can provide 90 degrees of phase shift, the phase shift circuit 206 can introduce a phase shift of 90 degrees, and the drive circuit can provide an inversion to ensure oscillation of proof mass 203. In certain examples, the output of the drive sense C2V 205 can be used by the AGC circuit 201 to monitor and control the amplitude of the proof mass oscillations.

Figure 3:
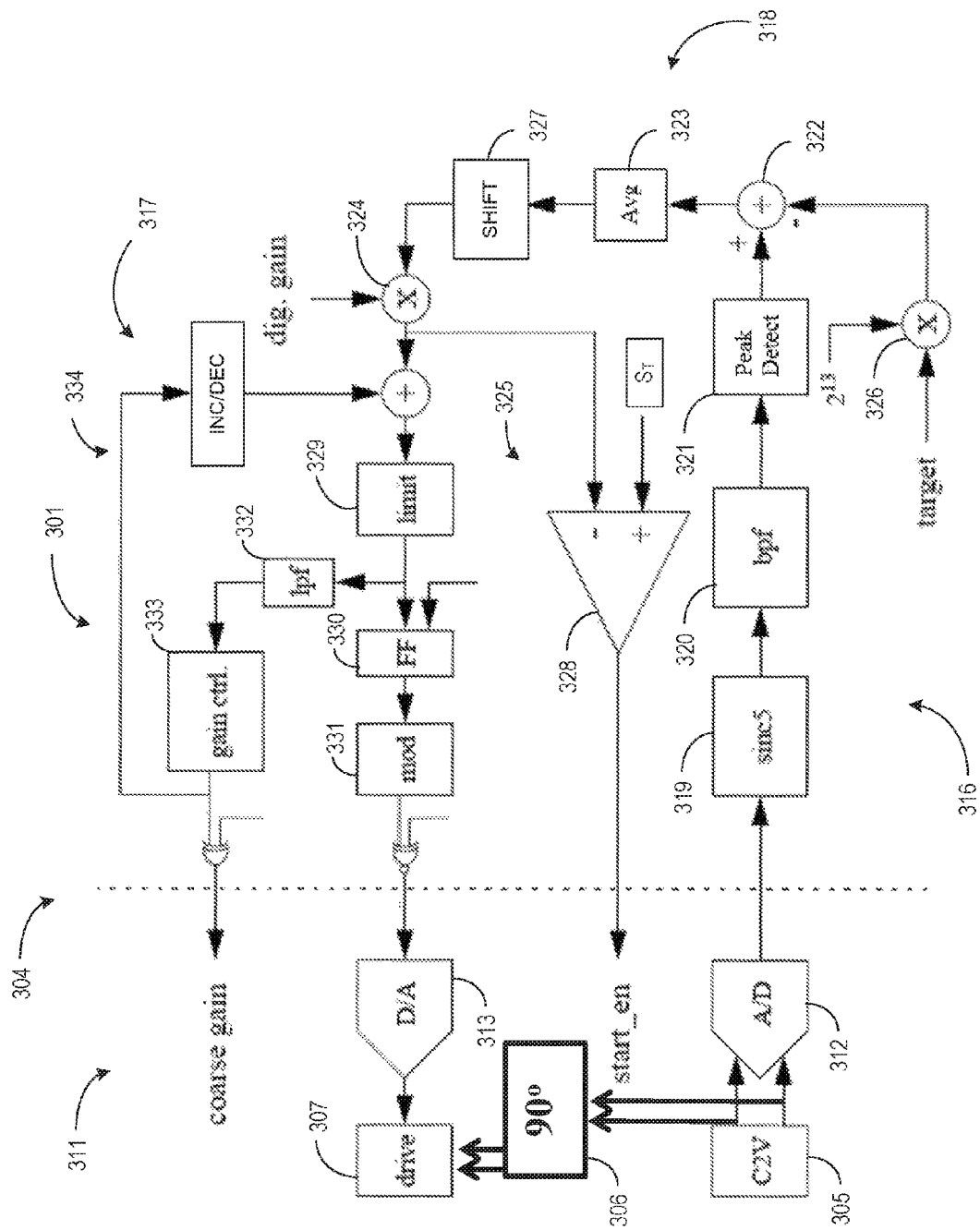
FIG. 3 illustrates generally an example MEMS control circuit including an example digital automatic gain control (AGC) circuit.

FIG. 3 illustrates generally an example MEMS control circuit 304 including an example digital AGC circuit 301. In certain examples, the MEMS control circuit 204 can be coupled to a MEMS device, such as a MEMS gyroscope (not shown). In certain examples, the MEMS gyroscope can include a proof mass, drive electrodes, drive sense electrodes and sense electrodes (not shown). In certain examples, the MEMS control circuit 304 can include an analog section 311 and a digital AGC circuit 301. In certain examples, the analog section 311 can include, a drive sense C2V converter 305, an input analog-to-digital converter (ADC) 312, an output digital-to-analog converter (DAC) 313, a drive circuit 307 and a phase shift circuit 306 coupled between the drive circuit 307 and the output of the drive sense C2V converter 305.

In certain examples, the drive sense C2V converter 305 can receive a capacitive signal from drive sense electrodes of the MEMS gyroscope and provide a voltage signal indicative of the capacitive signal. The voltage signal can be used to provide position information of the proof mass, such as phase and amplitude feedback, to the drive circuit 307. In certain examples, the drive circuit 307 can provide a power signal to vibrate the proof mass of the MEMS gyroscope. In some examples, the drive circuit 307 can vibrate the proof mass at a resonant frequency. In some examples, the drive circuit can provide a power signal to vibrate the proof mass using electrostatic actuation. In certain examples, the drive sense C2V converter 305 can provide capacitive sensed position information of the proof mass as the proof mass vibrates. In an example, a phase shift circuit 306 can introduce a phase shift of 90 degrees to the output of the drive sense C2V converter 305 to ensure oscillation (or vibration) of the proof mass. Accordingly, the drive circuit 307 can receive the phase shifted output from phase shift circuit 306 to drive the proof mass. In such an example, the phase shift circuit 306 can introduce a phase shift of 90 degrees relative to the motion of proof mass to provide a 180 degree shift to the drive circuit 307 needed to ensure oscillation of proof mass. In certain examples, the output of the drive sense C2V 305 can be used by the digital AGC circuit 301 to monitor and control the amplitude of the proof mass oscillations.

In certain examples, the digital AGC 301 of the MEMS control circuit 304 can include an input section 316, an output section 317, and a control section 318.

In certain examples, the input section 316 can include the drive sense ADC 312 and various lifters 319, 320 for providing a digitized drive sense signal. In an example, the drive sense ADC 312 can include a band-pass delta-sigma ADC. It is understood that other types of ADC converters are possible without departing from the scope of the pr ent subject matter. In certain examples, a band-pass sigma-delta ADC can provide simple digital conversion of a drive sense signal while avoiding 1/f noise. In certain examples, the input section 316 can include a sin $c^5$ filter 319 to downsample a single-bit data stream output of the drive sense ADC 312 and provide a multi-bit representation of the single-bit data stream output of the drive sense ADC 312, and a band-pass filter 320 to remove much of the out-of-band noise of the band pass filtered input signal. In an example, the sin $c^5$ filter 319 can receive a single-bit data stream operating at a data rate of about 972 kHz. In an example, the band-pass filter 320 can operate at a lower data rate than the sin $c^5$ filter 319. In certain examples, the band-pass filter 320 can operate at a data rate that is about an eighth of the data rate of the sin $c^5$ filter 319. In some examples, the band-pass filter 320 can have a bandwidth of about 500 Hz. In certain examples, the input section 316 can include a digital amplitude detector 321 to detect a representation of the oscillation amplitude of the output signal of the band-pass filter 320. In some examples, the digital amplitude detector 321 can include an absolute value (|x|) amplitude detector. In an example, the digital amplitude detector 321 can include an $x^2$ digital amplitude detector that can be immune to non-idealities in sampling instant time (e.g. timing jitter) and, thus, reduce phase noise.

In certain examples, the control section 318 can receive a target amplitude set point (target), and can include a summing junction 322, an averaging filter 323, gain multiplier 324, and startup control logic 325. In certain examples, the control section 318 can include a set point multiplier 326 to scale the target amplitude set point (target) for summing with the output of the digital amplitude detector 321 of the input section 316. In certain examples, the summing junction 322 can provide an error signal, such as an amplitude error signal or an oscillation amplitude error signal, indicative of a difference between the output of the digital amplitude detector 321 and the target amplitude set point (target). In certain examples, the averaging filter 323 can be used to filter high frequency noise from the error signal. In some examples, the averaging filter 323 can include a finite impulse response (FIR) filter that can filter, or average, or smooth, the error signal over a given number of samples or sample periods. In certain examples, the averaging filter 323 can include a bit shift module 327 to scale the output of the averaging filter 323. In certain examples, the error signal can be multiplied, or amplified, by a gain (dig. gain) to provide a command signal for the proof mass drive circuit 307. In some examples, the control section 318 can include an integral error gain module (not shown). In some example, the control section 318 does not include an integral error gain module to allow a simpler implementation. In certain examples that do not include an integral gain module, low frequency doublets that can take hundreds of ms to seconds to settle to its final value can be avoided.

In some examples, startup control logic 325 can be used to drive the proof mass during start-up, for example, when the error signal can be quite large. In certain examples, the startup control logic 325 can include a comparator 328 to compare the command signal to a AGC enable threshold ($S_T$). In an example, when the command signal exceeds the AGC threshold ($S_T$), the comparator 328 provides a control signal (start_en) to have the drive circuit 307 drive the proof mass using a predetermined drive signal, such as a predetermined drive signal waveform. In an example, the control signal (start_en) of the start-up control logic 325 can be received by the drive circuit 307 such that the drive circuit 307 drives the proof mass using the predetermined drive signal. In certain examples, the predetermined drive signal can include a square wave waveform at a predetermined frequency. In certain examples, the phase shift circuit 306 can provide one or more template waveforms to the drive circuit 307, such as a sinusoidal waveform for AGC enabled amplitude control and the square waveform for start-up mode control. When the command signal shrinks such that it does not exceed the AGC enable threshold ($S_T$), the control signal (start_en) of the start-up control logic 325 can transition to a second state. In certain examples, the drive circuit can drive the proof mass responsive to the command signal when the control signal (start_en) is in the second state. In certain examples, the drive circuit 307 can drive the proof mass using a sinusoidal waveform when the start signal (start_en) is in the second state. In some examples, absence of an integral error gain component to the command signal can avoid bang-bang oscillatory behavior that can appear when the system is slewing, and can allow smooth transition between start-up mode type drive control and AGC amplitude drive control mode that is responsive to the command signal.

In certain examples, the output section 317 can split the command signal into a coarse gain output signal (coarse gain) using a coarse gain stage and a fine gain output signal using a fine gain stage. The fine gain stage can include a digital limiter 329, one or more digital up-samplers 330, 331, and a drive digital to analog converter (DAC), such as a sigma-delta (ΣΔ) (DAC) 313 to provide a basic unit change of the command signal. In certain examples, the coarse gain stage can include a low pass filter 332 to receive the limited command signal and a gain control counter 333 that can increment and decrement when the truncated, filtered, command signal overshoots or under shoots the fine gain registers, respectively. In certain examples, the coarse gain stage can include a feedback or correction loop 334 that can increment/decrement the non-limited command signal by a predetermined value after a change in the coarse gain output, such that the truncated command signal is not left at a maximum or minimum transition edge after a coarse gain change. In certain examples, the coarse gain output (coarse gain) can be updated at a slower rate than the fine gain output. In certain examples, a drive circuit 307 can receive the coarse gain output (coarse gain) and the fine gain output and can adjust a drive signal coupled to the proof mass in response to the received coarse and fine gain output signals.

In various examples, the digital AGC circuit 301 can be implemented on a single integrated circuit. In some examples, the digital AGC circuit 301 can be implemented on a single integrated circuit and can include one or more of the ΔΣ ADC and the ΣΔ DAC. In an example, the digital AGC circuit 301 can reduce noise in the output gain signals by executing a significant portion of the input stage, output stage and control stage in a digital environment.

ADDITIONAL NOTES

In Example 1, an apparatus can include a driver configured to oscillate a proof mass of a MEMS gyroscope, a charge-to-voltage (C2V) converter configured to receive a sense signal from a MEMS gyroscope and to provide oscillation information of the proof mass, an analog-to-digital converter (ADC) configured to receive the oscillation information of the proof mass and to provide a digital representation of the oscillation information, and a digital, automatic gain control circuit configured to receive the digital representation of the oscillation information, to provide oscillation amplitude error information using a comparison of the oscillation information to target amplitude information, and to provide a digital drive command signal using an amplified representation of the oscillation amplitude error information.

In Example 2, the ADC of Example 1 optionally is configured to provide the digital representation of the sense signal using a single-bit data stream.

In Example 3, the digital, automatic gain control circuit of any one or more of Examples 1-2 optionally includes a down-sample module to receive the single-bit data stream and provide a second digital representation of the sense signal using a first multi-bit data stream.

In Example 4, the digital, automatic gain control circuit of any one or more of Examples 1-3 optionally includes a band pass filter configured to receive the first multi-bit data stream and provide a third digital representation of the sense signal using a second multi-bit data stream.

In Example 5, the digital, automatic gain control circuit of any one or more of Examples 1-4 optionally includes an amplitude detector configured to perform a square operation of the third digital representation of the sense signal to provide amplitude information of the sense signal.

In Example 6, the digital, automatic gain control circuit of any one or more of Examples 1-5 optionally includes a digital comparator configured to receive amplitude information and the target information and to provide the oscillation amplitude error information.

In Example 7, the digital, automatic gain control circuit of any one or more of Examples 1-6 optionally includes a finite impulse response filter configured to average the oscillation amplitude error information over a plurality of sample periods to provide a smoothed error signal.

In Example 8, the ADC of any one or more of Examples 1-7 optionally includes a band-pass, delta-sigma ADC.

In Example 9, the apparatus of any one or more of Examples 1-8 optionally includes a digital-to-analog converter configured to receive at least a portion of the digital drive command signal and to provide an analog command signal to the driver.

In Example 10, the digital, automatic gain control circuit of any one or more of Examples 1-9 optionally includes an output stage, the output stage including a fine gain register configured to provide a basic unit of change of the digital drive command signal, a low pass filter, and a coarse gain counter configured to increment on overshoot of the fine gain register, to decrement on undershoot of the fine gain register, and to provide a correction to the amplified representation of the oscillation amplitude error information.

In Example 11, a method can include oscillating a proof mass of a MEMS gyroscope using a driver, receiving oscillation information of the proof mass using a charge-to-voltage converter, providing a digital representation of the oscillation information using an analog to digital converter, providing oscillation amplitude error information using a comparison of the oscillation information to target amplitude information, and a digital automatic gain control circuit, and providing a digital drive command signal using the oscillation amplitude error information and the digital automatic gain control circuit.

In Example 12, the providing a digital representation of any one or more of Examples 1-11 optionally includes providing a digital representation of the oscillation information using a using a single-bit data stream.

In Example 13, the method of any one or more of Examples 1-12 optionally includes down-sampling the single-bit data stream to provide a second digital representation of the oscillation information using a multi-bit data stream.

In Example 14, the method of any one or more of Examples 1-13 optionally includes processing the first multi-bit data stream using a band-pass filter to provide a third digital representation of the oscillation information.

In Example 15, the method of any one or more of Examples 1-14 optionally includes receiving the third digital representation of the oscillation information at a amplitude detector of the digital automatic gain control circuit, and providing amplitude information of the oscillation information using the amplitude detector.

In Example 16, the method of any one or more of Examples 1-15 optionally includes comparing the amplitude information to the target information to provide the oscillation amplitude error information using a digital comparator of the digital automatic gain control circuit.

In Example 17, the method of any one or more of Examples 1-16 optionally includes averaging the oscillation amplitude error information over a predetermined number of samples using a finite impulse response filter to provide a smoothed error signal.

In Example 18, the method of any one or more of Examples 1-17 optionally includes converting the digital, drive command signal to an analog, drive command signal using an digital-to-analog converter, and receiving the analog command signal at the driver.

In Example 19, the method of any one or more of Examples 1-18 optionally includes receiving the amplified representation of the oscillation amplitude error information at an output stage of the digital automatic gain control circuit; processing the amplified representation of the oscillation amplitude error information using a digital limiter and one or more digital up-samplers to provide a fine portion of the digital drive command signal, and processing the amplified representation of the oscillation amplitude error information using a low pass filter and a gain control counter to provide a coarse portion of the digital drive command signal.

In Example 20, the processing the amplified representation of the oscillation amplitude error information using a low pass filter and a gain control counter of any one or more of Examples 1-18 optionally includes incrementing the gain control counter when the low pass filter overshoots; and decrementing the gain control counter when the low pass filter undershoots.

In Example 21, the processing the amplified representation of the oscillation amplitude error information using a low pass filter and a gain control counter of any one or more of Examples 1-20 optionally includes feeding back a correction to the amplified representation of the oscillation amplitude error information when a value of the gain control counter changes.

Example 22 can include, or can optionally be combined with any portion or combination of any portions of any one or more of Examples 1 through 21 to include, subject matter that can include means for performing any one or more of the functions of Examples 1 through 21, or a machine-readable medium including instructions that, when performed by a machine, cause the machine to perform any one or more of the functions of Examples 1 through 21.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus comprising:
   a driver configured to oscillate a proof mass of a MEMS gyroscope;
   a charge-to-voltage (C2V) converter configured to receive a sense signal from a MEMS gyroscope and to provide oscillation information of the proof mass;
   an analog-to-digital converter (ADC) configured to receive the oscillation information of the proof mass and to provide a digital representation of the oscillation information; and
   a digital, automatic gain control circuit configured to receive the digital representation of the oscillation information, to provide oscillation amplitude error information using a comparison of the oscillation information to target amplitude information, and to provide a digital drive command signal using an amplified representation of the oscillation amplitude error information, the digital, automatic gain control circuit includes an output stage, the output stage including:
      a fine gain register configured to provide a basic unit of change of the digital drive command signal;
      a low pass filter; and
      a coarse gain counter configured to increment on overshoot of the fine gain register, to decrement on undershoot of the fine gain register, and to provide a correction to the amplified representation of the oscillation amplitude error information.

2. The apparatus of claim 1, wherein the ADC is configured to provide the digital representation of the sense signal using a single-bit data stream.

3. The apparatus of claim 2, wherein the digital, automatic gain control circuit includes a down-sample module to receive the single-bit data stream and provide a second digital representation of the sense signal using a first multi-bit data stream.

4. The apparatus of claim 3, wherein the digital, automatic gain control circuit includes a band pass filter configured to receive the first multi-bit data stream and provide a third digital representation of the sense signal using a second multi-bit data stream.

5. The apparatus of claim 4, wherein the digital, automatic gain control circuit includes an amplitude detector configured to perform a square operation of the third digital representation of the sense signal to provide amplitude information of the sense signal.

6. The apparatus of claim 4, wherein the digital, automatic gain control circuit includes a digital comparator configured to receive amplitude information and the target information and to provide the oscillation amplitude error information.

7. The apparatus of claim 6, wherein the digital, automatic gain control circuit includes a finite impulse response filter configured to average the oscillation amplitude error information over a plurality of sample periods to provide a smoothed error signal.

8. The apparatus of claim 1, wherein the ADC includes a band-pass, delta-sigma ADC.

9. The apparatus of claim 1, including a digital-to-analog converter configured to receive at least a portion of the digital drive command signal and to provide an analog command signal to the driver.

10. A method comprising:
    oscillating a proof mass of a MEMS gyroscope using a driver;
    receiving oscillation information of the proof mass using a charge-to-voltage converter;
    providing a digital representation of the oscillation information using an analog to digital converter;
    providing oscillation amplitude error information using a comparison of the oscillation information to target amplitude information, and a digital automatic gain control circuit;
    providing a digital drive command signal using the oscillation amplitude error information and the digital automatic gain control circuit;
    receiving an amplified representation of the oscillation amplitude error information at an output stage of the digital automatic gain control circuit;
    processing the amplified representation of the oscillation amplitude error information using a digital limiter and one or more digital up-samplers to provide a fine portion of the digital drive command signal; and
    processing the amplified representation of the oscillation amplitude error information using a low pass filter and a gain control counter to provide a coarse portion of the digital drive command signal.

11. The method of claim 10, wherein providing a digital representation includes providing a digital representation of the oscillation information using a using a single-bit data stream.

12. The method of claim 11, including down-sampling the single-bit data stream to provide a second digital representation of the oscillation information using a multi-bit data stream.

13. The method of claim 12, including processing the first multi-bit data stream using a band-pass filter to provide a third digital representation of the oscillation information.

14. The method of claim 13, including:
    receiving the third digital representation of the oscillation information at a amplitude detector of the digital automatic gain control circuit; and
    providing amplitude information of the oscillation information using the amplitude detector.

15. The method of claim 14, including comparing the amplitude information to the target information to provide the oscillation amplitude error information using a digital comparator of the digital automatic gain control circuit.

16. The method of claim 15, including averaging the oscillation amplitude error information over a predetermined number of samples using a finite impulse response filter to provide a smoothed error signal.

17. The method of claim 10, including converting the digital, drive command signal to an analog, drive command signal using an digital-to-analog converter; and
    receiving the analog command signal at the driver.

18. The method of claim 10, wherein processing the amplified representation of the oscillation amplitude error information using a low pass filter and a gain control counter includes incrementing the gain control counter when the low pass filter overshoots; and decrementing the gain control counter when the low pass filter undershoots.

19. The method of claim 10, wherein processing the amplified representation of the oscillation amplitude error information using a low pass filter and a gain control counter includes feeding back a correction to the amplified representation of the oscillation amplitude error information when a value of the gain control counter changes.

* * * * *